US009650496B2

(12) United States Patent
van der Mee et al.

(10) Patent No.: US 9,650,496 B2
(45) Date of Patent: May 16, 2017

(54) INTERIOR AIRCRAFT COMPONENTS AND METHODS OF MANUFACTURE

(71) Applicant: SABIC Innovative Plastics IP B.V., Bergen op Zoom (NL)

(72) Inventors: Mark Adrianus Johannes van der Mee, Breda (NL); Paul Dean Sybert, Evansville, IN (US); Robert Dirk van de Grampel, Tholen (NL); Roland Sebastian Assink, Middelburg (NL)

(73) Assignee: SABIC GLOBAL TECHNOLOGIES B.V. (NL)

( * ) Notice: Subject to any disclaimer, the term of this patent is extended or adjusted under 35 U.S.C. 154(b) by 981 days.

(21) Appl. No.: 13/915,710

(22) Filed: Jun. 12, 2013

(65) Prior Publication Data

US 2014/0370213 A1    Dec. 18, 2014

(51) Int. Cl.
| | |
|---|---|
| *C08K 5/52* | (2006.01) |
| *C08K 5/5393* | (2006.01) |
| *C08K 5/3432* | (2006.01) |
| *C08K 5/3475* | (2006.01) |
| *C08L 69/00* | (2006.01) |
| *C08L 83/04* | (2006.01) |
| *C08K 5/49* | (2006.01) |
| *C08K 5/521* | (2006.01) |
| *C08K 5/523* | (2006.01) |
| *C08G 77/448* | (2006.01) |
| *C08L 83/10* | (2006.01) |

(52) U.S. Cl.
CPC ............. *C08K 5/52* (2013.01); *C08G 77/448* (2013.01); *C08K 5/3432* (2013.01); *C08K 5/3475* (2013.01); *C08K 5/49* (2013.01); *C08K 5/521* (2013.01); *C08K 5/523* (2013.01); *C08K 5/5393* (2013.01); *C08L 69/005* (2013.01); *C08L 83/04* (2013.01); *C08L 83/10* (2013.01); *Y10T 428/1352* (2015.01); *Y10T 428/31507* (2015.04)

(58) Field of Classification Search
CPC . C08K 5/52; C08K 5/523; C08K 5/49; C08K 5/521; C08K 5/3475; C08K 5/5393; C08K 5/3432; C08G 77/448; C08L 69/005; C08L 83/04; C08L 83/10; Y10T 428/1352; Y10T 428/31507
See application file for complete search history.

(56) References Cited

U.S. PATENT DOCUMENTS

| | | | |
|---|---|---|---|
| 4,430,484 A | 2/1984 | Quinn | |
| 4,710,548 A | 12/1987 | Byrne | |
| 6,204,313 B1 | 3/2001 | Bastiaens et al. | |
| 7,767,738 B2 | 8/2010 | Gaggar et al. | |
| 7,790,292 B2 | 9/2010 | Colborn et al. | |
| 2005/0159577 A1 | 7/2005 | Davis et al. | |
| 2006/0142527 A1 | 6/2006 | Glasgow et al. | |
| 2007/0049706 A1 | 3/2007 | Siripurapu et al. | |
| 2007/0066737 A1 | 3/2007 | Gallucci et al. | |
| 2007/0129492 A1 | 6/2007 | Colborn et al. | |
| 2008/0004404 A1 | 1/2008 | van de Grampel et al. | |
| 2008/0119631 A1 | 5/2008 | Mullen | |
| 2009/0306258 A1 | 12/2009 | Siripurapu et al. | |
| 2011/0229704 A1 | 9/2011 | Grcev et al. | |
| 2012/0251750 A1 | 10/2012 | Sybert et al. | |

FOREIGN PATENT DOCUMENTS

| | | |
|---|---|---|
| CA | 2157082 A1 | 5/1996 |
| DE | 3844183 A1 | 6/1990 |
| EP | 0645422 A1 | 3/1995 |
| JP | 09183893 | 7/1997 |
| JP | 10007897 | 1/1998 |
| WO | 2013130809 A1 | 9/2013 |

OTHER PUBLICATIONS

U.S. Appl. No. 13/724,780, filed Dec. 12, 2012.
U.S. Appl. No. 13/780,355, filed Feb. 28, 2013.
U.S. Appl. No. 13/780,430, filed Feb. 28, 2013.
U.S. Appl. No. 13/874,700, filed May 1, 2013.
U.S. Appl. No. 13/874,746, filed May 1, 2013.
U.S. Appl. No. 13/874,896, filed May 1, 2013.
Heat Release, Currenta GmbH & Co. OHG information sheet: "prCEN/TS 45545-2 (Feb. 2008)—Fire protection on railway vehicles: Heat Release", Feb. 2008, 3 pages.
Lateral Flame Spread, Currenta GmbH & Co. OHG information sheet: "CEN TS 45545-2 (Feb. 2008)—Fire protection on railway vehicles: Lateral Flame Spread", Feb. 2008, 2 pages.
Lin et al., "Polymers with Improved Flammability chracteristics. I.Phenolphthalein-Related Homopolymers", Journal of Polymer Science: Polymer Chemistry Edition, Vo. 19, pp. 2659-2670, 1981, XP009050158.
Smoke Optical Density and Toxicity, Currenta GmbH & Co. OHG information sheet: "prCEN/TS 45545-2 (Feb. 2008)—Fire protection on railway vehicles: Smoke optical desnity and toxicity", Feb. 2008, 4 pages.

(Continued)

*Primary Examiner* — Robert Jones, Jr.
(74) *Attorney, Agent, or Firm* — Cantor Colburn LLP

(57) ABSTRACT

Interior aircraft components comprise a thermoplastic composition comprising: a first polymer comprising bisphenol A carbonate units and monoaryl arylate units, or a second polymer comprising bisphenol A carbonate units, monoaryl arylate units, and siloxane units, or a combination comprising at least one of the foregoing polymers; and an organophosphorus compound; wherein a sample of the thermoplastic composition has: an OSU integrated 2 minute heat release test value of less than 65 kW-min/m$^2$ and a peak heat release rate of less than 65 kW/m$^2$, an E662 smoke test DsMax value of less than 200, a flame time of less than 15 seconds, a burn length of less than 6 inches, and a drip extinguishing time of less than 5 seconds, an energy in multiaxial impact of 100 J or more and a ductility in multiaxial impact of 100%.

31 Claims, 3 Drawing Sheets

(56) References Cited

OTHER PUBLICATIONS

Schartel, B. "Phosphorus-based Flame Retardancy Mechanisms—Old Hat or a Starting Point for Future Development?", Materials, 2010, vol. 3, pp. 4710-4745.
International Search Report for International Application No. PCT/US2014/041856, Application Filing Date Jun. 11, 2014, Date of Mailing Dec. 16, 2014, 5 pages.
Written Opinion for International Application No. PCT/US2014/041856, Application Filing Date Jun. 12, 2014, Date of Mailing Dec. 16, 2014, 4 pages.

INTERIOR AIRCRAFT COMPONENTS AND METHODS OF MANUFACTURE

BACKGROUND OF THE INVENTION

This disclosure generally relates to components for aircrafts, and in particular aircraft components having low smoke density and low heat release.

Flame retardant (FR) polymers and polymer blends, for example polycarbonates and polycarbonate blends with UL V0 and 5V A and B Underwriters Laboratories flammability ratings are widely prepared and used, especially in a wide variety of electrical and electronic applications. Conversely, only a very limited set of polycarbonates are used in aircraft applications particularly interior parts such as windows, partition walls, ceiling panels, cabinet walls, storage compartments, galley surfaces, light panels, and the like. All of these applications have stringent flammability safety requirements that the polycarbonates must meet. Particular requirements include smoke density, flame spread, and heat release values. In the United States, Federal Aviation Regulation (FAR) Part 25.853 sets forth the airworthiness standards for aircraft compartment interiors. The safety standards for aircraft and transportation systems used in the United States include a smoke density test specified in FAR 25.5 Appendix F, Part V Amdt 25-116. Flammability requirements include the "60 second test" specified in FAR 25.853(a) Appendix F, Part I, (a), 1, (i) and the heat release rate standard (referred to as the OSU 65/65 standard) described in FAR F25.4 (FAR Section 25, Appendix F, Part IV), or the French flame retardant tests such as, NF-P-92-504 (flame spread) or NF-P-92-505 (drip test). In another example, the aircraft manufacturer Airbus has smoke density and other safety requirements set forth in ABD0031. In the event of a fire, components made from materials having these properties can increase the amount of time available for escape and provide for better visibility during a fire.

Despite extensive investigation, a need still exists for improved materials that meet governmental and aircraft manufacturer flame safety requirements and that have improved melt flow, especially for injection molding applications, improved UV stability, improved light transmission, and relatively low color. Such materials should also have as good mechanical properties as possible, such as toughness (high impact strength and high ductility). It would be a further advantage if such materials could be manufactured to be colorless and transparent. Still other advantageous features include good processability for forming articles, smooth surface finish, and light stability.

BRIEF SUMMARY OF THE INVENTION

Disclosed herein is an aircraft component, wherein the aircraft component is a molded, formed or extruded component, comprising from a thermoplastic polymer composition comprising, based on the total weight of the composition, 90 to 97.5 wt. % of a poly(carbonate-arylate ester); 2.5 to 10 wt. % of an aromatic organophosphorus compound such as BPADP or RDP; and optionally, up to 5 wt. % of an additive composition comprising an additive selected from a processing aid, a heat stabilizer, an ultra violet light absorber, a colorant, or a combination comprising at least one of the foregoing, wherein a sample of the thermoplastic composition has an OSU integrated 2 minute heat release test value of less than 65 kW-min/m$^2$ and a peak heat release rate of less than 65 kW/m$^2$, each measured using the method of FAR F25.4, in accordance with FAR 25.853 (d) at a thickness of 1.5 or 3 mm, an E662 smoke test DsMax value of less than 200 when measured at a thickness of 1.5 mm or 3 mm, a flame time of less than 15 seconds, a burn length of less than 6 inches, and a drip extinguishing time of less than 5 seconds, each measured using the method of FAR F25.5, in accordance FAR 25.853(a) at a thickness of 1.5 or 3 mm, a multiaxial impact energy of 100 J or higher and a ductility of 100%, measured at +23° C. at an impact speed of 4.4 m/second in accordance with ISO 6603 on 3.2 mm thick discs, and optionally, a melt volume flow rate of greater than 5 cc/10 min measured at 300° C. under 1.2 kg force according to ISO 1133.

Also disclosed herein is an aircraft component wherein the component is a partition or a light cover, and wherein the aircraft component is molded or formed from a thermoplastic polymer composition comprising, based on the total weight of the composition, 90 to 97.5 wt. % of a polycarbonate-arylate ester); 2.5 to 10 wt. % of an aromatic organophosphorus compound such as BPADP or RDP; and optionally, up to 5 wt. % of an additive composition comprising an additive selected from a processing aid, a heat stabilizer, an ultra violet light absorber, a colorant, or a combination comprising at least one of the foregoing, and 0.05 to 10 wt. % of a light diffuser additive, based on the total weight of polymers in the thermoplastic polymer composition; wherein a molded or formed sample of the thermoplastic polymer composition has a transmission of 20% to 90% or a haze of 70% to 99.9%, each measured according to ASTM D1003 using the color space CIE1931 (Illuminant C and a 2° observer) at 3 mm thickness, an OSU integrated 2 minute heat release test value of less than 65 kW-min/m$^2$ and a peak heat release rate of less than 65 kW/m$^2$, each measured using the method of FAR F25.4, in accordance with FAR 25.853 (d) at a thickness of 1.5 or 3 mm, an E662 smoke test DsMax value of less than 200 when measured at a thickness of 1.5 mm or 3 mm, a flame time of less than 15 seconds, a burn length of less than 6 inches, and a drip extinguishing time of less than 5 seconds, each measured using the method of FAR F25.5, in accordance FAR 25.853(a) at a thickness of 1.5 or 3 mm, a multiaxial impact energy of 100 J or higher and a ductility of 100%, measured at +23° C. at an impact speed of 4.4 m/second in accordance with ISO 6603 on 3.2 mm thick discs, and optionally, a melt volume flow rate of greater than 5 cc/10 min measured at 300° C. under 1.2 kg force according to ISO 1133.

Also described is an aircraft component, wherein the aircraft component is a trolley sidewall, an access door, or an access panel, and wherein the aircraft component is molded or formed from a thermoplastic polymer composition comprising, based on the total weight of the composition, 90 to 97.5 wt. % of a polycarbonate-arylate ester); 2.5 to 10 wt. % of an aromatic organophosphorus compound such as BPADP or RDP; and optionally, up to 5 wt. % of an additive composition comprising an additive selected from a processing aid, a heat stabilizer, an ultra violet light absorber, a colorant, or a combination comprising at least one of the foregoing, wherein a molded or formed sample of the thermoplastic polymer composition has a transmission of 70% to 87% or a haze of 2% to 10%, each measured according to ASTM D1003 using the color space CIE1931 (Illuminant C and a 2° observer) at 3 mm thickness, an OSU integrated 2 minute heat release test value of less than 65 kW-min/m$^2$ and a peak heat release rate of less than 65 kW/m$^2$, each measured using the method of FAR F25.4, in accordance with FAR 25.853 (d) at a thickness of 1.5 or 3 mm, an E662 smoke test DsMax value of less than 200 when measured at a thickness of 1.5 mm or 3 mm, a flame time of less than 15 seconds, a burn length of less than 6 inches, and a drip extinguishing time of less than 5 seconds, each measured using the method of FAR F25.5, in accordance FAR 25.853(a) at a thickness of 1.5 or 3 mm, a multiaxial impact energy of 100 J or higher and a ductility of 100%, measured at +23° C. at an impact speed of 4.4 m/second in accordance with ISO 6603 on 3.2 mm thick discs, and optionally, a melt volume flow rate of greater than 5 cc/10 min measured at 300° C. under 1.2 kg force according to ISO 1133.

Also described is an aircraft component, wherein the aircraft component is a window, window dust cover, partition, light cover, electronics screen, display cover, or plastic mirror, and wherein the aircraft component is molded or formed from a thermoplastic polymer composition comprising, based on the total weight of the composition, 90 to 97.5 wt. % of a poly(carbonate-arylate ester); 2.5 to 10 wt. % of an aromatic organophosphorus compound such as BPADP or RDP; and optionally, up to 5 wt. % of an additive composition comprising an additive selected from a processing aid, a heat stabilizer, an ultra violet light absorber, a colorant, or a combination comprising at least one of the foregoing, wherein a molded or formed sample of the thermoplastic polymer composition has a transmission of 85% or more or a haze of 3% or less, each measured according to ASTM D1003 using the color space CIE1931 (Illuminant C and a 2° observer) at 3 mm thickness, an OSU integrated 2 minute heat release test value of less than 65 kW-min/m$^2$ and a peak heat release rate of less than 65 kW/m$^2$, each measured using the method of FAR F25.4, in accordance with FAR 25.853 (d) at a thickness of 1.5 or 3 mm, an E662 smoke test DsMax value of less than 200 when measured at a thickness of 1.5 mm or 3 mm, a flame time of less than 15 seconds, a burn length of less than 6 inches, and a drip extinguishing time of less than 5 seconds, each measured using the method of FAR F25.5, in accordance FAR 25.853(a) at a thickness of 1.5 or 3 mm, a multiaxial impact energy of 100 J or higher and a ductility of 100%, measured at +23° C. at an impact speed of 4.4 m/second in accordance with ISO 6603 on 3.2 mm thick discs, and optionally, a melt volume flow rate of greater than 5 cc/10 min measured at 300° C. under 1.2 kg force according to ISO 1133.

Also described is an aircraft component, wherein the component is an access door panel, an access door panel call button, a seat component, a stow bin component, a magazine rack, a component of a stow bin, a magazine rack, a seat component, a trolly cart, a component of a trolley cart, a light bezel, a door pull, a door handle, an arm rest or a foot rest, wherein the aircraft component is molded or formed from a thermoplastic polymer composition comprising, based on the total weight of the composition, 90 to 97.5 wt. % of a poly(carbonate-arylate ester); 2.5 to 10 wt. % of an aromatic organophosphorus compound such as BPADP or RDP; and optionally, up to 5 wt. % of an additive composition comprising an additive selected from a processing aid, a heat stabilizer, an ultra violet light absorber, a colorant, or a combination comprising at least one of the foregoing; wherein a sample of the thermoplastic composition has an OSU integrated 2 minute heat release test value of less than 65 kW-min/m$^2$ and a peak heat release rate of less than 65 kW/m$^2$, each measured using the method of FAR F25.4, in accordance with FAR 25.853 (d) at a thickness of 1.5 or 3 mm, an E662 smoke test DsMax value of less than 200 when measured at a thickness of 1.5 mm or 3 mm, a flame time of less than 15 seconds, a burn length of less than 6 inches, and a drip extinguishing time of less than 5 seconds, each measured using the method of FAR F25.5, in accordance FAR 25.853(a) at a thickness of 1.5 or 3 mm, a multiaxial impact energy of 100 J or higher and a ductility of 100%, measured at +23° C. at an impact speed of 4.4 m/second in accordance with ISO 6603 on 3.2 mm thick discs, and optionally, a melt volume flow rate of greater than 5 cc/10 min measured at 300° C. under 1.2 kg force according to ISO 1133.

Also described is a method of manufacture of the aircraft component, the method comprising molding, or extruding the above-described composition to form the component.

The above described and other features are exemplified by the following Detailed Description, Figures, and Examples.

BRIEF DESCRIPTION OF THE FIGURES

A description of the Figures, which are meant to be exemplary and not limiting, is provided below.

DETAILED DESCRIPTION OF THE INVENTION

Figure 1:
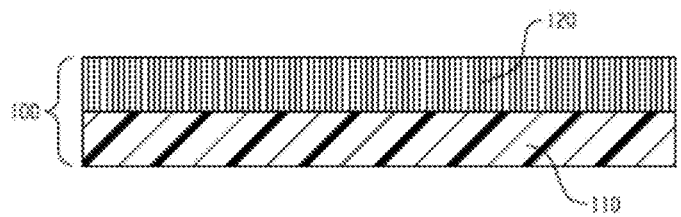
FIG. 1 is a diagram of a hard coated sheet.

The inventors hereof have developed articles for use in the aircraft interiors. The articles can unexpectedly be obtained by use of specific thermoplastic compositions. Particularly, it has been surprisingly discovered that upon the addition of a small amount of an aromatic organic phosphate, such as BPADP to a poly(carbonate-arylate ester) copolymer, comprising polyarylate units, carbonate units and optionally low levels of polysiloxane units, allows the manufacture of aircraft components that have low smoke density and low heat release, meeting or exceeding governmental and aircraft manufacturer flame safety requirements.

These results are surprising because the poly(carbonate-arylate ester) copolymer itself does not meet the requirements of "60 second test" specified in FAR 25.853(a) Appendix F. Part I, (a), 1, (i). In order to meet the complete FAR 25.853 requirement set, the poly(carbonate-arylate ester) copolymer has to be blended with brominated polycarbonate. However, blending with brominated polycarbonate makes the part opaque and halogen-rich. Another way to achieve meeting the FAR 25.853 requirement set is to apply a hardcoat onto parts made from poly(carbonate-arylate ester) copolymer. However, application of a hardcoat has the obvious disadvantage of a secondary operation, which would desirably be avoided.

The results are particularly surprising because in the past, it is known from experiments that the addition of phosphates to polycarbonate copolymer compositions significantly deteriorates the performance in the smoke density test specified in FAR 25.5 Appendix F. Part V Amdt 25-116. Accordingly, parts made from compositions comprising phosphates and polycarbonate copolymers, such as poly(carbonate-arylate ester), comprising polyarylate units, carbonate units, and optionally siloxane units, are not expected to meet the complete set of FAR25.853 requirements.

The inventors have surprisingly found that upon optimizing the phosphate content in compositions comprising an aromatic phosphate, such as BPADP, and a poly(carbonate-arylate ester) copolymer, compositions are obtained having a balance of smoke and heat release properties. Specifically, a sample of the composition can have an OSU integrated 2 minute heat release test value of less than 65 kW-min/m² and a peak heat release rate of less than 65 kW/m², each measured using the method of FAR F25.4, in accordance with FAR 25.853 (d), an E662 smoke test DsMax value of less than 200 when measured at a thickness of 1.5 mm or 3 mm, a flame time of less than 15 seconds, a burn length of less than 6 inches, and a drip extinguishing time of less than 5 seconds, each measured using the method of FAR F25.5, in accordance FAR 25.853(a), The compositions can further have excellent flow properties, far outperforming the existing composition comprising brominated polycarbonate and poly(carbonate-arylate ester) copolymer, which allows the use of these compositions in the manufacture of large and complex injection molded parts. In a further advantageous feature, melt flow at low shear rates (MVR) are also low enough to allow efficient sheet extrusion. The relatively low heat properties, which are very comparable to polycarbonate/acrylonitriles butadiene styrene (PC/ABS) alloys, allow easy forming of parts. In all cases, parts made from these compositions have good practical impact properties. Furthermore, these compositions are inherently transparent and have low haze values, allowing the manufacture of parts with high transparency, without the need for applying a hardcoat. As a further advantageous feature, these compositions are completely free of halogens. Such compositions are especially useful in the manufacture of flame retardant, low smoke components that can be used in aircraft applications. Accordingly, provided herein are aircraft components formed, molded or extruded from a thermoplastic composition comprising an organophosphorus compound and a poly(carbonate-arylate ester), that is a copolymer comprising repeating carbonate units and repeating arylate ester units. As described in more detail below, the copolymers can additionally contain siloxane units.

The repeating structural carbonate units of the poly(carbonate-arylate ester) are of formula (1)

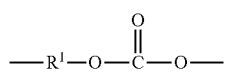
(1)

in which at least 75%, at least 90%, at least 95%, of the total number of $R^1$ groups contain aromatic moieties and the balance thereof are aliphatic, alicyclic, or aromatic groups. In an embodiment each $R^1$ is an aromatic group, for example a $C_{6-30}$ aromatic group that contains at least one aromatic moiety, to provide optimal flammability performance of the poly(carbonate-arylate ester)s. $R^1$ can be derived from a dihydroxy compound of the formula HO—$R^1$—OH, in particular a group of formula (2)

HO-$A^1$-$Y^1$-$A^2$-OH     (2)

wherein each of $A^1$ and $A^2$ is a monocyclic divalent aromatic group and $Y^1$ is a single bond or a bridging group having one or more atoms that separate $A^1$ from $A^2$. For example, one atom separates $A^1$ from $A^2$. Specifically, each $R^1$ can be derived from an aromatic dihydroxy compound, in particular a bisphenol of formula (3)

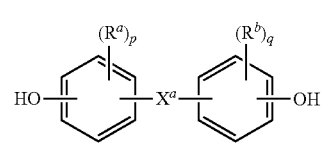
(3)

wherein $R^a$ and $R^b$ are each independently a $C_{1-12}$ alkyl; and p and q are each independently integers of 0 to 4. It will be understood that $R^a$ is hydrogen when p is 0, and likewise $R^b$ is hydrogen when q is 0. In an embodiment, no halogen is present.

Also in formula (3), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorus. The $C_{1-18}$ organic group can be disposed such that the $C_6$ arylene groups connected thereto are each connected to a common alkylidene carbon or to different carbons of the $C_{1-18}$ organic bridging group. p and q can each be 1, and $R^a$ and $R^b$ can each be a $C_{1-3}$ alkyl group, specifically methyl, disposed meta to the hydroxy group on each arylene group.

$X^a$ can be a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X^a$ is a substituted cycloalkylidene is the cyclohexylidene-bridged, alkyl-substituted bisphenol of formula (4)

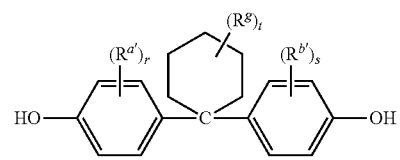
(4)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. Specifically, at least one of each of $R^{a'}$ and $R^{b'}$ are disposed meta to the cyclohexylidene bridging group. The substituents $R^{a'}$, $R^{b'}$, and $R^g$ can, when comprising an appropriate number of carbon atoms, be straight chain, cyclic, bicyclic, branched, saturated, or unsaturated. $R^{a'}$ and $R^{b'}$ can each independently be $C_{1-4}$ alkyl, $R^g$ is $C_{1-4}$ alkyl, r and s are each 1, and t is 0 to 5. Likewise, $R^{a'}$, $R^{b'}$ and $R^g$ can each be methyl, where r and s can each be 1, and t is 0 or 3. The cyclohexylidene-bridged bisphenol can be the reaction product of two moles of o-cresol with one mole of cyclohexanone. In another example, the cyclohexylidene-bridged bisphenol is the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures.

$X^a$ can also be a $C_{1-18}$ alkylene group, a $C_{3-18}$ cycloalkylene group, a fused $C_{6-18}$ cycloalkylene group, or a group of the formula —$B^1$-Q-$B^2$— wherein $B^1$ and $B^2$ are the same or different $C_{1-6}$ alkylene group and Q is a $C_{3-12}$ cycloalkylidene group or a $C_{6-16}$ arylene group.

$X^a$ can also be a substituted $C_{3-18}$ cycloalkylidene of formula (5)

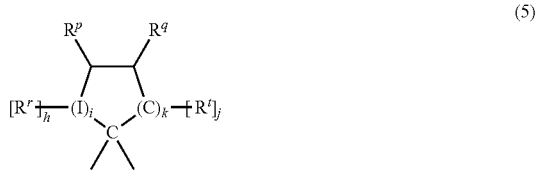

(5)

wherein $R^r$, $R^p$, $R^q$, and $R^t$ are each independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, RP, $R^q$, and $R^t$ taken together are a fused cycloaliphatic, aromatic, or heteroaromatic ring. It will be understood that where the fused ring is aromatic, the ring as shown in formula (5) will have an unsaturated carbon-carbon linkage where the ring is fused. When k is one and i is 0, the ring as shown in formula (5) contains 4 carbon atoms, when k is 2, the ring as shown in formula (5) contains 5 carbon atoms, and when k is 3, the ring contains 6 carbon atoms. The two adjacent groups (e.g., $R^q$ and $R^t$ taken together) can form an aromatic group, and likewise, $R^q$ and $R^t$ taken together can form one aromatic group and $R^r$ and $R^p$ taken together can form a second aromatic group. When $R^q$ and $R^t$ taken together form an aromatic group, $R^p$ can be a double-bonded oxygen atom, i.e., a ketone.

Other useful aromatic dihydroxy compounds of the formula HO—$R^1$—OH include monoaryl dihydroxy compounds of formula (6)

(6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine. In an embodiment, no halogen is present.

Some illustrative examples of specific aromatic dihydroxy compounds include 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxy-dibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl)methane, 1,1-bis(4-hydroxyphenyl)ethane, 2,2-bis(4-hydroxyphenyl)propane (hereinafter "bisphenol-A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-2-methylphenyl)propane, 1,1-bis(4-hydroxy-t-butylphenyl)propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used.

In a specific embodiment, the polycarbonate units are of the formula (1a)

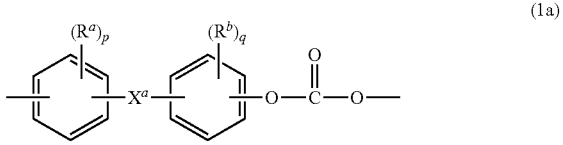

(1a)

wherein $R^a$ and $R^b$ are each independently are each independently $C_{1-12}$ alkyl, p and q are each independently integers of 0 to 4, and $X^a$ is a single bond, —O—, —S—, —S(O)—, —S(O)$_2$—, —C(O)—, or a $C_{1-18}$ organic group. Alternatively, $R^a$ and $R^b$ are each independently a $C_{1-3}$ alkyl, p and q are each independently 0 or 1, and $X^a$ is alkylidene of formula —C(R$^c$)(R$^d$)— wherein $R^c$ and $R^d$ are each $C_{1-6}$ alkyl. Specifically, the carbonate units are derived from bisphenol-A, in which each of $A^1$ and $A^2$ is p-phenylene and $Y^1$ is isopropylidene in formula (1a). Such units are referred to herein as "bisphenol A carbonate units."

In addition to carbonate units (1), specifically carbonate units (1a), more specifically bisphenol-A carbonate units, the poly(carbonate-arylate ester) copolymers contain repeating arylate ester units of formula (7)

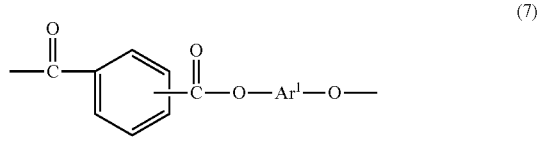

(7)

wherein $Ar^1$ is a $C_{6-32}$ hydrocarbyl group containing at least one aromatic group, e.g., a phenyl, naphthalene, anthracene, or the like. In an embodiment, $Ar^1$ is derived from a bisphenol (3), a monoaryl dihydroxy compound (6), or a combination comprising different bisphenol or monoaryl dihydroxy compounds. Thus, arylate ester units (7) can be derived by reaction of isophthalic acid, terephthalic acid, or a combination comprising at least one of the foregoing (referred to herein as a "phthalic acid"), with an aromatic bisphenol (3), a monoaryl dihydroxy compound (6), or a combination comprising at least one of the foregoing. The molar ratio of isophthalate to terephthalate can be 1:99 to 99:1, or 80:20 to 20:80, or 60:40 to 40:60.

The poly(carbonate-arylate ester) copolymers comprising carbonate units (1), specifically bisphenol-A carbonate units, and arylate ester units (7) can be alternating or block copolymers of formula (8)

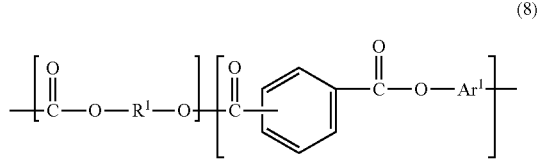

(8)

wherein $R^1$ and $Ar^1$ are as defined in formulas (1) and (7), respectively.

In general, the copolymers are block copolymers containing carbonate blocks and ester blocks. The weight ratio of total ester units to total carbonate units in the copolymers can vary broadly, for example from 99:1 to 1:99, or from 95:5 to 5:95, specifically from 90:10 to 10:90, or more specifically from 90:10 to 50:50, depending on the desired properties of the thermoplastic composition. The molar ratio of isophthalate to terephthalate in the ester units of the copolymers can also vary broadly, for example from 0:100 to 100:0, or from 92:8 to 8:92, more specifically from 98:2 to 45:55, depending on the desired properties of the thermoplastic composition. For example, the weight ratio of total ester units to total carbonate can be 99:1 to 40:60, or 90:10 to 50:40, wherein the molar ratio of isophthalate to terephthalate is from 99:1 to 40:50, more specifically 98:2 to 45:55, depending on the desired properties of the thermoplastic composition.

Additional carbonate units derived from the dihydroxy compound used to form the arylate ester units (7) can also be present in the copolymers, for example in amounts of less than 20 mole %, less than 10 mole %, less than 5 mole %, or less than 1 mole % based on the total moles of units in the copolymer. It is also possible to have additional arylate ester units present derived from reaction of the phthalic acid with the dihydroxy compound used to form the carbonate units, for example in amounts of less than 20 mole %, less than 10 mole %, less than 5 mole %, or less than 1 mole % based on the total moles of units in the copolymer. In an embodiment, the combination of such additional carbonate units and such additional arylate ester units are present in an amount of less than 20 mole %, less than 10 mole %, less than 5 mole %, or less than 1 mole % based on the total moles of units in the copolymer.

A specific poly(carbonate-arylate ester) is a poly(carbonate-bisphenol arylate ester) comprising carbonate units (1), specifically bisphenol carbonate units, even more specifically bisphenol-A carbonate units and repeating bisphenol arylate ester units. Bisphenol arylate units comprise residues of phthalic acid and a bisphenol, for example a bisphenol (3). In an embodiment the bisphenol arylate ester units are of formula (7a)

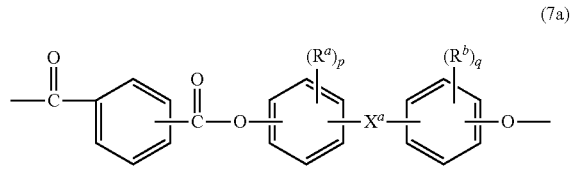

(7a)

wherein $R^a$ and $R^b$ are each independently $C_{1-12}$ alkyl, p and q are each independently 0 to 4, and $X^a$ is a bridging group between the two arylene groups, and is a single bond, —O—, —S—, —S(O)—, —S(O)$_2$—, —C(O)—, or a $C_{1-18}$ organic group. In an embodiment $X^a$ can be a substituted or unsubstituted $C_{3-18}$ cycloalkylidene, a $C_{1-25}$ alkylidene of formula —C(R$^c$)(R$^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=R$^e$)— wherein $R^e$ is a divalent $C_{1-12}$ hydrocarbon group. For example, $R^a$ and $R^b$ are each independently a $C_{1-3}$ alkyl, p and q are each independently 0 or 1, and $X^a$ is alkylidene of formula —C(R$^c$)(R$^d$)— wherein $R^c$ and $R^d$ are each $C_{1-6}$ alkyl. In an embodiment, p and q is each 1, and $R^a$ and $R^b$ are each a $C_{1-3}$ alkyl group, specifically methyl, disposed meta to the oxygen on each ring. The bisphenol can be bisphenol-A, where p and q are both 0 and $X^a$ is isopropylidene. In an embodiment, the ratio of the weight percent of ester units to weight percent carbonate units in the copolymers is 50:50 to 99:1, or 55:45 to 90:10, or 75:25 to 95:5.

A specific example of a poly(carbonate-bisphenol arylate ester) is a poly(bisphenol-A carbonate)-co-poly(bisphenol-A phthalate ester) of formula (8a)

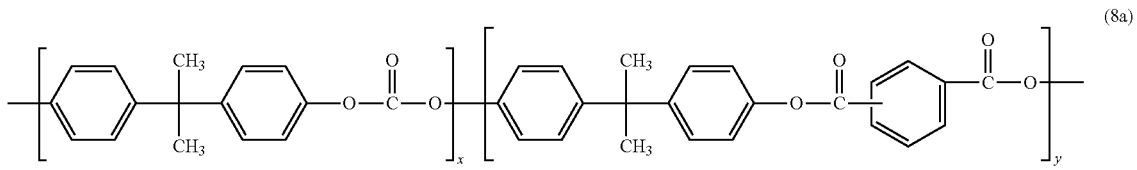

wherein x and y represent the weight percent of bisphenol-A carbonate units and arylate-bisphenol-A ester units, respectively. Generally, the units are present as blocks. In an embodiment, the ratio of the weight percent carbonate units x to ester units y in the copolymers is 50:50 to 1:99, or 45:55 to 35:65, or 25:75 to 15:85. Thus, copolymers of formula (8a) comprising 35 to 45 wt. % of carbonate units and 55 to 65 wt. % of ester units, wherein the ester units have a molar ratio of isophthalate to terephthalate of 45:55 to 55:45 are often referred to as poly(carbonate-ester)s (PCE) and copolymers comprising 15 to 25 wt. % of carbonate units and 75 to 85 wt. % of ester units having a molar ratio of isophthalate to terephthalate from 98:2 to 88:12 are often referred to as poly(phthalate-carbonate)s (PPC).

In another embodiment, a specific poly(carbonate-arylate ester) is a poly(carbonate-monoaryl arylate ester) comprising carbonate units (1), specifically bisphenol carbonate units, even more specifically bisphenol-A carbonate units, and repeating monoaryl arylate-ester units of formula (7b)

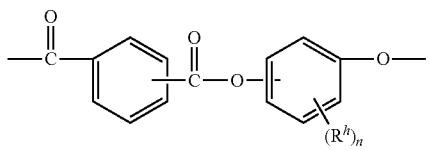

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. Specifically, each $R^h$ is independently a $C_{1-4}$ alkyl, and n is 0 to 3, 0 to 1, or 0. These poly(carbonate-monoaryl arylate) copolymers are of formula (8b)

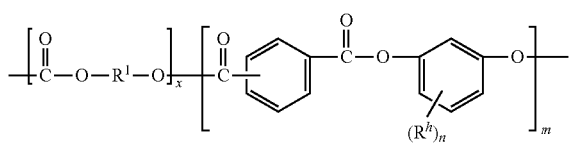

wherein $R^1$ is as defined in formula (1) and $R^h$, and n are as defined in formula (7b), and the mole ratio of x:m is 99:1 to 1:99, specifically 80:20 to 20:80, or 60:40 to 40:60.

A specific example of monoaryl ester unit (7b) is derived from the reaction of a phthalic diacid (or a derivative thereof) with resorcinol (or a reactive derivative thereof) to provide isophthalate-terephthalate-resorcinol ("ITR" ester units) of formula (7c)

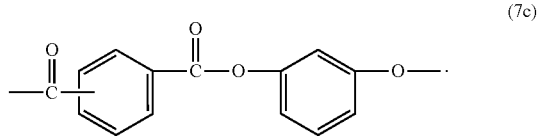

In an embodiment, the ITR ester units are present in the polycarbonate-arylate ester) copolymer in an amount greater than or equal to 95 mol %, specifically greater than or equal to 99 mol %, and still more specifically greater than or equal to 99.5 mol % based on the total moles of ester units in the copolymer. Such (isophthalate-terephthalate-resorcinol)-carbonate copolymers ("ITR-PC") can possess many desired features, including toughness, transparency, and weatherability. ITR-PC copolymers can also have desirable thermal flow properties. In addition, ITR-PC copolymers can be readily manufactured on a commercial scale using interfacial polymerization techniques, which allow synthetic flexibility and composition specificity in the synthesis of the ITR-PC copolymers.

As described above, the ITR-PC polymers can further optionally comprise small amounts of other carbonate units, for example 1 to 20 mole % of other carbonate units, based on the total moles of units in the copolymers. In an embodiment, the other carbonate unit arises from carbonylation of the monoaryl dihydroxy compound (6). Other arylate ester units can optionally be present, for example 1 to 20 mole % of bisphenol arylate ester units (7b), based on the total moles of units in the copolymers. The bisphenol arylate units can arise from the presence of a bisphenol used to form the carbonate units. In an embodiment, wherein the total amount of the combination is other carbonate units and other arylate ester units is 1 to 20 mole %, based on the total moles of units in the copolymers.

A specific example of a poly(carbonate)-co-poly(monoaryl arylate ester) is a poly(bisphenol-A carbonate)-co-poly(isophthalate-terephthalate-resorcinol ester) of formula (8c)

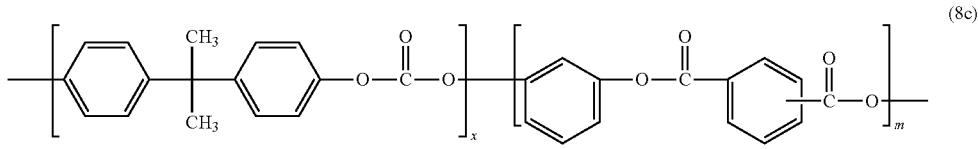

wherein m is 4 to 100, 4 to 90, 5 to 70, more specifically 5 to 50, or still more specifically 10 to 30, and the mole ratio of x:m is 99:1 to 1:99, specifically 90:10 to 10:90. The ITR ester units are present in the poly(carbonate-arylate ester) copolymer in an amount greater than or equal to 95 mol %, specifically greater than or equal to 99 mol %, and still more specifically greater than or equal to 99.5 mol % based on the total moles of ester units. Other carbonate units, other ester units, or a combination comprising at least one of the foregoing can be present, in a total amount of 1 to 20 mole % based on the total moles of units in the copolymers, for example resorcinol carbonate units of the formula

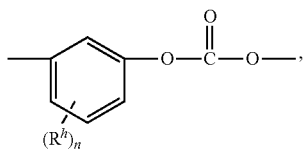

and bisphenol-A phthalate ester units of the formula

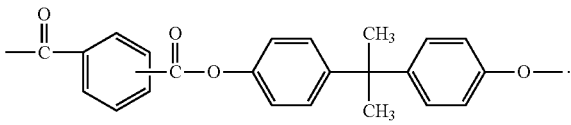

In an embodiment, poly(bisphenol-A carbonate)-co-poly(isophthalate-terephthalate-resorcinol ester) (8c) comprises 1 to 20 mol % of bisphenol-A carbonate units, 60-98 mol % of isophthalic acid-terephthalic acid-resorcinol ester units, and optionally 1 to 20 mol % of resorcinol carbonate units, isophthalic acid-terephthalic acid-bisphenol-A phthalate ester units, or a combination comprising at least one of the foregoing.

The poly(carbonate-arylate ester) copolymers can be prepared by methods known in the art. For example, the copolymers are units can be prepared from polycarbonate blocks and polyester blocks. Polycarbonate blocks and polyester blocks can be obtained by interfacial polymerization or melt polymerization.

Polycarbonate blocks can be manufactured by processes such as interfacial polymerization and melt polymerization. Although the reaction conditions for interfacial polymerization can vary, an exemplary process generally involves dissolving or dispersing the dihydroxy reactant in aqueous caustic soda or potash, adding the resulting mixture to a water-immiscible solvent medium, and contacting the reactants with a carbonate precursor in the presence of a catalyst such as triethylamine and/or a phase transfer catalyst, under controlled pH conditions, e.g., 8 to 12. The most commonly used water immiscible solvents include methylene chloride, 1,2-dichloroethane, chlorobenzene, toluene, and the like. Exemplary carbonate precursors include a carbonyl halide such as carbonyl bromide or carbonyl chloride or a haloformate such as a bishaloformates of a dihydric phenol (e.g., the bischloroformates of bisphenol-A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br, a $C_{1-8}$ alkoxy group or a $C_{6-18}$ aryloxy group. An effective amount of a phase transfer catalyst can be 0.1 to 10 wt. % based on the weight of bisphenol in the phosgenation mixture. In another embodiment an effective amount of phase transfer catalyst can be 0.5 to 2 wt. % based on the weight of bisphenol in the phosgenation mixture.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha,alpha-dimethyl benzyl) phenol), 4-chloroformyl phthalic anhydride, trimesic acid, and benzophenone tetracarboxylic acid. The branching agents can be added at a level of 0.05 to 2.0 wt. %. Combinations comprising linear and branched polycarbonate blocks can be used.

For the polyester blocks, rather than using the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used. The polyesters can also be obtained by melt-process condensation as described above, by solution phase condensation, or by transesterification polymerization wherein, for example, a dialkyl ester such as dimethyl terephthalate can be transesterified with the dihydroxy reactant using acid catalysis, to generate the polyester blocks. Branched polyester blocks, in which a branching agent, for example, a glycol having three or more hydroxyl groups or a trifunctional or multifunctional carboxylic acid has been incorporated, can be used. Furthermore, it can be desirable to have various concentrations of acid and hydroxyl end groups on the polyester blocks, depending on the ultimate end use of the composition.

The poly(carbonate-arylate ester)s can have a weight average molecular weight (Mw) of 2,000 to 100,000 g/mol, specifically 3,000 to 75,000 g/mol, more specifically 4,000 to 50,000 g/mol, more specifically 5,000 to 35,000 g/mol, and still more specifically 17,000 to 30,000 g/mol. Molecular weight determinations are performed using GPC using a cross linked styrene-divinyl benzene column, at a sample concentration of 1 milligram per milliliter, and as calibrated with polycarbonate standards. Samples are eluted at a flow rate of 1.0 ml/min with methylene chloride as the eluent.

In another embodiment, the poly(carbonate-arylate ester) copolymers further comprise siloxane units (also known as "diorganosiloxane units"). In a specific embodiment these copolymers comprises carbonate units (1) derived from a bisphenol (3), specifically bisphenol-A; monoaryl arylate ester units (7b), and siloxane units. Still more specifically, the poly(carbonate-arylate ester) copolymers comprises bisphenol-A carbonate units, ITR ester units (7c), and siloxane units (9). For convenience, these polymers, poly(bisphenol-A carbonate)-co-poly(isophthalate-terephthalate-resorcinol ester)-co-poly(siloxane), are referred to herein as "ITR-PC-siloxane" copolymers.

The polysiloxane units are of formula (9)

(9)

wherein each R is independently a $C_{1-13}$ monovalent hydrocarbyl group. For example, each R can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination comprising at least one of the foregoing. In an embodiment no halogens are present. Combinations of the foregoing R groups can be used in the same copolymer. In an embodiment, the polysiloxane comprises R groups that have minimal hydrocarbon content. In a specific embodiment, an R group with a minimal hydrocarbon content is a methyl group.

The average value of E in formula (9) can vary widely depending on the type and relative amount of each component in the thermoplastic composition, whether the polymer is linear, branched or a graft copolymer, the desired properties of the composition, and like considerations. In an embodiment, E has an average value of 2 to 500, or 2 to 200, or 2 to 90, or 2 to 50, or 2 to 30. In an embodiment E has an average value of 16 to 50, more specifically 20 to 45, and even more specifically 25 to 45. In another embodiment, E has an average value of 4 to 50, 4 to 15, specifically 5 to 15, more specifically 6 to 15, and still more specifically 7 to 10.

In an embodiment, the polysiloxane units are structural units of formula (9a)

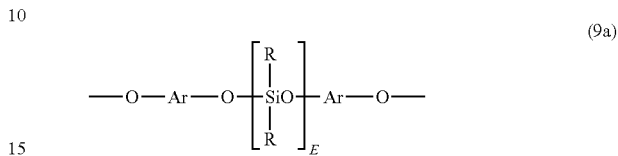

(9a)

wherein E is as defined above; each R can independently be the same or different, and is as defined above; and each Ar can independently be the same or different, and is a substituted or unsubstituted $C_{6-30}$ compound containing an aromatic group, wherein the bonds are directly connected to the aromatic moiety. The Ar groups in formula (9a) can be derived from a $C_{6-30}$ dihydroxy aromatic compound, for example a bisphenol compound as described above or a monoaryl dihydroxy compound (6) above. Combinations comprising at least one of the foregoing dihydroxy aromatic compounds can also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane. Combinations comprising at least one of the foregoing dihydroxy compounds can also be used. In an embodiment, the dihydroxy aromatic compound is unsubstituted, or is does not contain non-aromatic hydrocarbyl substituents such as alkyl, alkoxy, or alkylene substituents.

In a specific embodiment, where Ar is derived from resorcinol, the polysiloxane units are of the formula (9a-1)

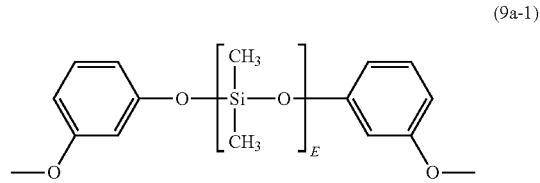

(9a-1)

or, where Ar is derived from bisphenol-A, the polysiloxane has the formula (9a-2)

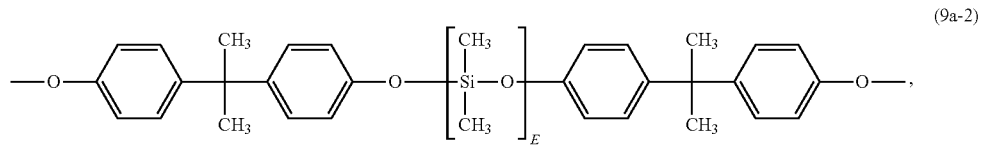

(9a-2)

or a combination comprising at least one of the foregoing, wherein E has an average value as described above, specifically an average value of 2 to 200, 2 to 90, 2 to 50, or 2 to 30, 5 to 15, or 7 to 10.

In another embodiment, polydiorganosiloxane units are units of formula (9b)

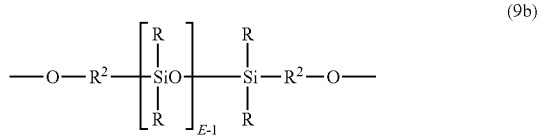
(9b)

wherein R and E are as described for formula (9), and each $R^2$ is independently a divalent $C_{1-30}$ alkylene or $C_{7-30}$ arylene-alkylene. In a specific embodiment, where $R^2$ is $C_{7-30}$ arylene-alkylene, the polydiorganosiloxane units are of formula (9b-1)

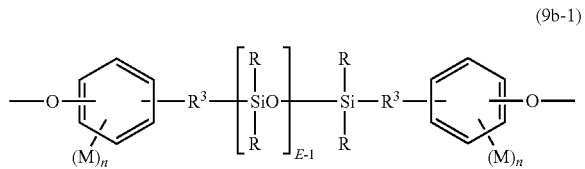
(9b-1)

wherein R and E are as defined for formula (9), and each $R^3$ is independently a divalent $C_{2-8}$ aliphatic group. Each M in formula (25) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4. In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl. The foregoing poly(carbonate-siloxane) copolymers can be manufactured by the methods described in U.S. Pat. No. 6,072,011 to Hoover, for example.

In a specific embodiment, the polysiloxane units are eugenol-capped polysiloxane of formula (9b-2)

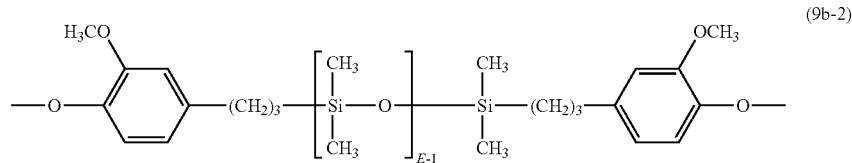
(9b-2)

where E has an average value as described above, specifically 2 to 200, 2 to 90, 2 to 50, or 2 to 30, 5 to 15, or 7 to 10. In another specific embodiment, the polysiloxane units are of formula (9b-3) or (9b-4)

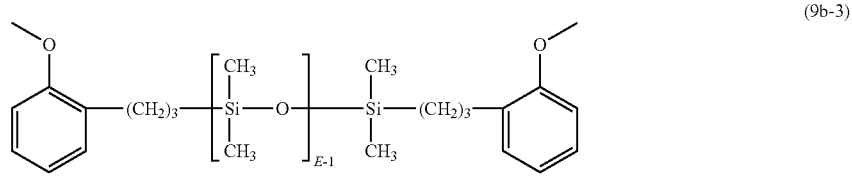
(9b-3)

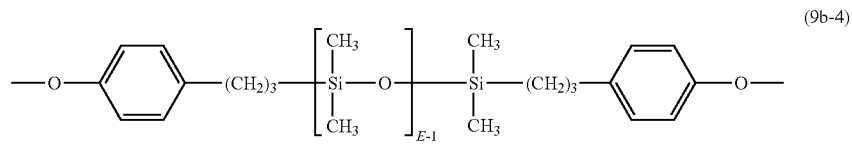
(9b-4)

where E has an average value as defined above, specifically an average value of 2 to 200, 2 to 90, 2 to 50, or 2 to 30, 5 to 15, or 7 to 10.

The relative amount polysiloxane units (9) in the ITR-PC-siloxane copolymers depends on the desired properties of the thermoplastic composition, such as impact, smoke density, heat release, and melt viscosity. In particular the poly(carbonate-arylate ester) is selected to have an average value of E that provides good impact and/or transparency properties, as well as to provide the desired weight percent of siloxane units in the thermoplastic composition. For example, the poly(carbonate-arylate ester)s can comprise siloxane units in an amount of 0.3 to 30 weight percent (wt. %), specifically 0.5 to 25 wt. %, or 0.5 to 15 wt. %, based on the total weight of the polymers in the thermoplastic composition, with the proviso that the siloxane units are provided by polysiloxane units covalently bonded in the polymer backbone of the poly(carbonate-arylate ester).

In an embodiment, the PC-ITR-siloxane copolymers comprise 1 to 40 mol %, or 1 to 20 mol % of bisphenol-A carbonate units, 50 to 95 mol % of ITR ester units (7c), and an amount of polysiloxane units (9b), specifically (9b-1), even more specifically (9b-2), (9b-3), (9b-4) or a combination comprising at least one of the foregoing, specifically (9b-2), in an amount effective to provide 0.1 to 10 wt. % of siloxane units, each based on the total copolymer. For example, the PC-ITR-siloxane copolymers can comprise 1 to 20 mol % of bisphenol-A carbonate units, 60 to 90 mole % of ITR ester units, and an amount of polysiloxane units (9b-2), (9b-3), (9b-4) or a combination comprising at least one of the foregoing (specifically of formula 9b-2) effective to provide 0.1 to 10 wt. % of siloxane units, each based on the total copolymer.

Other carbonate units, other ester units, or a combination comprising at least one of the foregoing can be present in the PC-ITR-siloxane copolymers, in a total amount of 1 to 20 mole % based on the total moles of units in the copolymers, for example resorcinol carbonate units, and bisphenol-A phthalate ester units of the formula. In an embodiment, the ITR-PC-siloxane comprises 1 to 20 mol % of bisphenol-A carbonate units, 60-98 mol % of isophthalic acid-terephthalic acid-resorcinol ester units, and optionally 1 to 20 mol % of resorcinol carbonate units (10), isophthalic acid-terephthalic acid-bisphenol-A ester units (11), or a combination comprising at least one of the foregoing, together with the siloxane units.

Methods for the manufacture of the ITR-PC-siloxane copolymers are known. The ITR-PC-siloxane copolymers can have an intrinsic viscosity, as determined in chloroform at 25° C., of 0.3 to 1.5 deciliters per gram (dl/g), specifically 0.45 to 1.0 dl/g. The PC-siloxane copolymers can have a weight average molecular weight ($M_w$) of 10,000 to 100,000 g/mol, measured according to gel permeation chromatography (GPC) using a cross linked styrene-divinyl benzene column, at a sample concentration of 1 milligram per milliliter, and as calibrated with polycarbonate standards.

The low heat release thermoplastic compositions comprise the above-described poly(carbonate-arylate ester)s in combination with an organophosphorus flame retardant in an amount effective to provide 0.1 to 1.0 wt. % phosphorus, based on the weight of the composition. Such compounds include aromatic organophosphorus compounds having at least one organic aromatic group and at least one phosphorus-containing group, as well as organic compounds having at least one phosphorus-nitrogen bond.

In the aromatic organophosphorus compounds that have at least one organic aromatic group, the aromatic group can be a substituted or unsubstituted $C_{3-30}$ group containing one or more of a monocyclic or polycyclic aromatic moiety (which can optionally contain with up to three heteroatoms (N, O, P, S, or Si)) and optionally further containing one or more nonaromatic moieties, for example alkyl, alkenyl, alkynyl, or cycloalkyl. The aromatic moiety of the aromatic group can be directly bonded to the phosphorus-containing group, or bonded via another moiety, for example an alkylene group. In an embodiment the aromatic group is the same as an aromatic group of the polycarbonate backbone, such as a bisphenol group (e.g., bisphenol-A), a monoarylene group (e.g., a 1,3-phenylene or a 1,4-phenylene), or a combination comprising at least one of the foregoing.

The phosphorus-containing group can be a phosphate ($P(=O)(OR)_3$), phosphite ($P(OR)_3$), phosphonate ($RP(=O)(OR)_2$), phosphinate ($R_2P(=O)(OR)$), phosphine oxide ($R_3P(=O)$), or phosphine ($R_3P$), wherein each R in the foregoing phosphorus-containing groups can be the same or different, provided that at least one R is an aromatic group. A combination of different phosphorus-containing groups can be used. The aromatic group can be directly or indirectly bonded to the phosphorus, or to an oxygen of the phosphorus-containing group (i.e., an ester).

In an embodiment the aromatic organophosphorus compound is a monomeric phosphate. Representative monomeric aromatic phosphates are of the formula $(GO)_3P=O$, wherein each G is independently an alkyl, cycloalkyl, aryl, alkylarylene, or arylalkylene group having up to 30 carbon atoms, provided that at least one G is an aromatic group. Two of the G groups can be joined together to provide a cyclic group. In some embodiments G corresponds to a monomer used to form the polycarbonate, e.g., resorcinol. Exemplary phosphates include phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, and the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of formula (14)

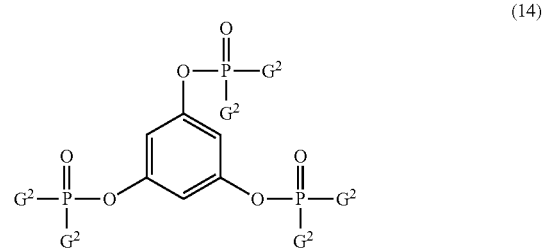

(14)

wherein each $G^2$ is independently a hydrocarbon or hydrocarbonoxy having 1 to 30 carbon atoms. In some embodiments G corresponds to a monomer used to form the polycarbonate, e.g., resorcinol.

Specific aromatic organophosphorus compounds have two or more phosphorus-containing groups, and are inclusive of acid esters of formula (15)

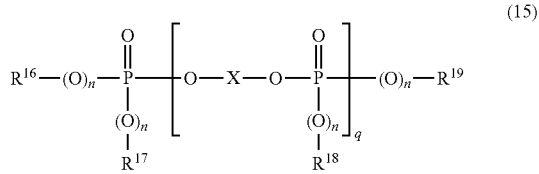

(15)

wherein $R^{16}$, $R^{17}$, $R^{18}$, and $R^{19}$ are each independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, specifically by $C_{1-4}$ alkyl and X is a mono- or poly-nuclear aromatic $C_{6-30}$ moiety or a linear or branched $C_{2-30}$ aliphatic radical, which can be OH-substituted and can contain up to 8 ether bonds, provided that at least one of $R^{16}$, $R^{17}$, $R^{18}$, $R^{19}$, and X is an aromatic group. In some embodiments $R^{16}$, $R^{17}$, $R^{18}$, and $R^{19}$ are each independently $C_{1-4}$ alkyl, naphthyl, phenyl $(C_{1-4})$alkylene, or aryl groups optionally substituted by $C_{1-4}$ alkyl. Specific aryl moieties are cresyl, phenyl, xylenyl, propylphenyl, or butylphenyl. In some embodiments X in formula (15) is a mono- or poly-nuclear aromatic $C_{6-30}$ moiety derived from a diphenol. Further in formula (15), n is each independently 0 or 1; in some embodiments n is equal to 1. Also in formula (15), q is from 0.5 to 30, from 0.8 to 15, from 1 to 5, or from 1 to 2. Specifically, X can be represented by the following divalent groups (16), or a combination comprising one or more of these divalent groups,

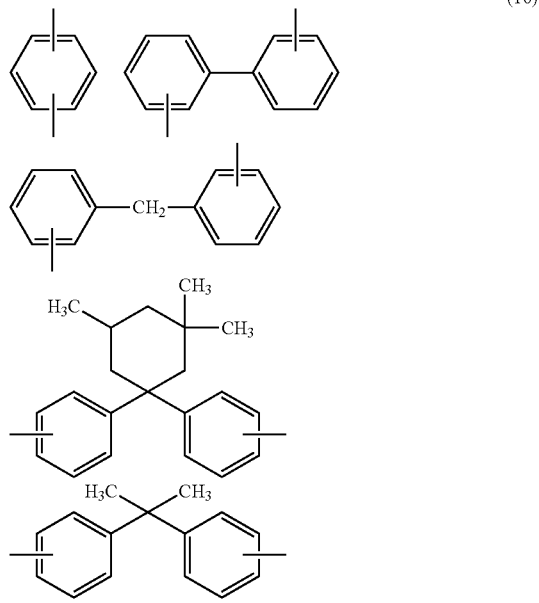

(16)

wherein the monophenylene and bisphenol-A groups can be specifically mentioned.

In these embodiments, each of $R^{16}$, $R^{17}$, $R^{18}$, and $R^{19}$ can be aromatic, i.e., phenyl, n is 1, and p is 1-5, specifically 1-2. In some embodiments at least one of e, $R^{17}$, $R^{18}$, $R^{19}$, and X corresponds to a monomer used to form the polycarbonate, e.g., bisphenol-A or resorcinol. In another embodiment, X is derived especially from resorcinol, hydroquinone, bisphenol-A, or diphenylphenol, and $R^{16}$, $R^{17}$, $R^{18}$, $R^{19}$, is aromatic, specifically phenyl. A specific aromatic organophosphorus compound of this type is resorcinol bis(diphenyl phosphate), also known as RDP. Another specific class of aromatic organophosphorus compounds having two or more phosphorus-containing groups are compounds of formula (17)

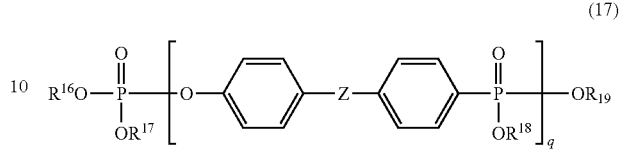

(17)

wherein $R^{16}$, $R^{17}$, $R^{18}$, $R^{19}$, and q are as defined for formula (15) and wherein Z is $C_{1-7}$ alkylidene, $C_{1-7}$ alkylene, $C_{5-12}$ cycloalkylidene, —O—, —S—, —SO$_2$—, or —CO—, specifically isopropylidene. A specific aromatic organophosphorus compound of this type is bisphenol-A bis(diphenyl phosphate), also known as BPADP, wherein $R^{16}$, $R^{17}$, $R^{18}$, and $R^{19}$ are each phenyl, and q is from 1 to 5, from 1 to 2, or 1.

Organophosphorus compounds containing at least one phosphorus-nitrogen bond includes phosphazenes, phosphorus ester amides, phosphoric acid amides, phosphonic acid amides, phosphinic acid amides, and tris(aziridinyl)phosphine oxide. Phosphazenes (18) and cyclic phosphazenes (19)

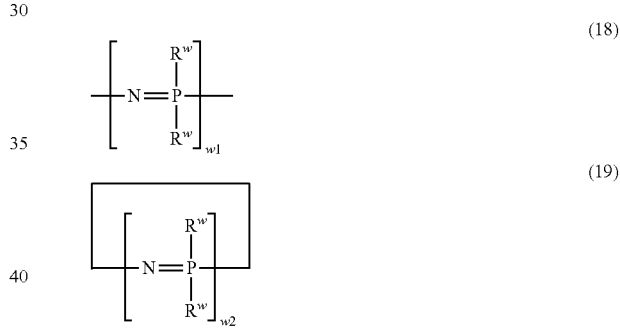

(18)

(19)

in particular can used, wherein w1 is 3 to 10,000 and w2 is 3 to 25, specifically 3 to 7, and each $R^w$ is independently a $C_{1-12}$ alkyl, alkenyl, alkoxy, aryl, aryloxy, or polyoxyalkylene group. In the foregoing groups at least one hydrogen atom of these groups can be substituted with a group having an N, S, O, or F atom, or an amino group. For example, each $R^w$ can be a substituted or unsubstituted phenoxy, an amino, or a polyoxyalkylene group. Any given $R^w$ can further be a crosslink to another phosphazene group. Exemplary crosslinks include bisphenol groups, for example bisphenol A groups. Examples include phenoxy cyclotriphosphazene, octaphenoxy cyclotetraphosphazene decaphenoxy cyclopentaphosphazene, and the like. A combination of different phosphazenes can be used. A number of phosphazenes and their synthesis are described in H. R. Allcock, "Phosphorus-Nitrogen Compounds" Academic Press (1972), and J. E. Mark et al., "Inorganic Polymers" Prentice-Hall International, Inc. (1992).

Accordingly, depending on the particular organophosphorus compound used, the thermoplastic compositions can comprise from 2.5 to 10 wt. %, or 3.5 to 10 wt. % or 4 to 8.0 wt. %, of the organophosphorus flame retardant, each based on the total weight of the composition. Specifically, the organophosphorus compounds can be bisphenol A bis (diphenyl phosphate), triphenyl phosphate, resorcinol bis (diphenyl phosphate), tricresyl phosphate, or a combination comprising at least one of the foregoing.

In an advantageous embodiment, it has been found that certain additives can be used without adversely affecting the heat release and low smoke properties of the poly(siloxane) copolymer compositions significantly, in particular UV stabilizers, heat stabilizers (including phosphites), other flame retardants (such as Rimar salts) and certain colorants. The use of pigments such as titanium dioxide produces white compositions, which are commercially desirable. Pigments such as titanium dioxide (or other mineral fillers) can be present in the poly(siloxane) copolymer compositions in amounts of 0 to 12 PHR, 0.1 to 9 PHR, 0.5 to 5 PHR, or 0.5 to 3 PHR.

Exemplary antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 PHR.

Exemplary heat stabilizer additives include organophosphites such as triphenyl phosphite, tris-(2,6-dimethylphenyl) phosphite, tris-(mixed mono- and di-nonylphenyl)phosphite; phosphonates such as dimethylbenzene phosphonate, phosphates such as trimethyl phosphate, or combinations comprising at least one of the foregoing heat stabilizers. Heat stabilizers are used in amounts of 0.01 to 0.1 PHR.

Light stabilizers and/or ultraviolet light (UV) absorbing additives can also be used. Exemplary light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations comprising at least one of the foregoing light stabilizers. Light stabilizers are used in amounts of 0.01 to 5 PHR.

Exemplary UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl)oxy]-2,2-bis[[(2-cyano-3,3-diphenylacryloyl)oxy]methyl]propane (UVINUL® 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than or equal to 100 nanometers, or combinations comprising at least one of the foregoing UV absorbers. UV absorbers are used in amounts of 0.01 to 5 PHR.

Plasticizers, lubricants, and/or mold release agents can also be present in the compositions. There is considerable overlap among these types of materials, which include phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl)phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a solvent; waxes such as beeswax, montan wax, and paraffin wax. Such materials are used in amounts of 0.1 to 1 PHR.

Additional monomeric flame retardants include organic compounds that include phosphorus, bromine, and/or chlorine. Non-brominated and non-chlorinated phosphorus-containing flame retardants can be added for certain applications, for example organic compounds containing phosphorus-nitrogen bonds.

Inorganic flame retardants can also be used, for example salts of $C_{1-16}$ alkyl sulfonate salts such as potassium perfluorobutane sulfonate (Rimar salt), potassium perfluorooctane sulfonate, tetraethylammonium perfluorohexane sulfonate, and potassium diphenylsulfone sulfonate; salts such as $Na_2CO_3$, $K_2CO_3$, $MgCO_3$, $CaCO_3$, and $BaCO_3$, or fluoroanion complexes such as $Li_3AlF_6$, $BaSiF_6$, $KBF_4$, $K_3AlF_6$, $KAlF_4$, $K_2SiF_6$, and/or $Na_3AlF_6$. When present, inorganic flame retardant salts are present in amounts of 0.01 to 10 PHR, more specifically 0.02 to 1 PHR.

Anti-drip agents in most embodiments are not used in the poly(siloxane) copolymer compositions. Anti-drip agents include a fibril-forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. Antidrip agents are substantially absent or completely absent from the poly(siloxane) copolymer compositions in some embodiments.

Colorants can be used in the thermoplastic compositions. The term "colorant" as used herein includes pigments (generally, particulate colorants that can be inorganic or organic) and dyes (generally organic colorants that are soluble in the compositions, including fluorescent compounds). The colorant can also have further properties such as electrical conductivity, or may be magnetically shielding. Examples of inorganic pigments are white pigments such as titanium dioxide in its three modifications of rutile, anatase or brookite, lead white, zinc white, zinc sulfide or lithopones; black pigments such as carbon black, black iron oxide, iron manganese black or spinel black; chromatic pigments such as chromium oxide, chromium oxide hydrate green, cobalt green or ultramarine green, cobalt blue, iron blue, Milori blue, ultramarine blue or manganese blue, ultramarine violet or cobalt and manganese violet, red iron oxide, cadmium sulfoselenide, molybdate red or ultramarine red; brown iron oxide, mixed brown, spinel phases and corundum phases or chromium orange; yellow iron oxide, nickel titanium yellow, chromium titanium yellow, cadmium sulfide, cadmium zinc sulfide, chromium yellow, zinc yellow, alkaline earth metal chromates, Naples yellow; bismuth vanadate, and effect pigments such as interference pigments and luster pigments. Other specific inorganic pigments include Pigment White 6, Pigment White 7, Pigment Black 7, Pigment Black 11, Pigment Black 22, Pigment Black 27/30, Pigment Yellow 34, Pigment Yellow 35/37, Pigment Yellow 42, Pigment Yellow 53, Pigment Brown 24, Pigment Yellow 119, Pigment Yellow 184, Pigment Orange 20, Pigment Orange 75, Pigment Brown 6, Pigment Brown 29, Pigment Brown 31, Pigment Yellow 164, Pigment Red 101, Pigment Red 104, Pigment Red 108, Pigment Red 265, Pigment Violet 15, Pigment Blue 28/36, Pigment Blue 29, Pigment Green 17, and Pigment Green 26/50. A combination comprising at least one of the foregoing pigments can be used. Pigments, when present, can be used in amounts of about 0.1 to 9 PHR, 0.5 to 5 PHR, or 0.5 to 3 PHR.

Exemplary dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis (styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1, 3,4-oxadiazole; 2,5-bis-(4-biphenylyl)-oxazole; 2,2'-dimethyl-p-quaterphenyl; 2,2-dimethyl-p-terphenyl; 3,5,3'''', 5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes can be used in amounts of 0.001 to 5 PHR.

Specific colorants include Solvent Red 135, Solvent Red 52, Solvent Blue 104, Solvent Yellow 93, Pigment Blue 60, copper phthalocyanine Pigment Blue 15:4, and Macrolex Violet 3R.

Compositions used to form light-diffusive articles, for example light-diffusive aircraft components, can further comprise a light diffuser additive, i.e., a plurality of light-diffusive particles to provide the light-diffusive effect. Such particles are generally insoluble in the polymers of the thermoplastic compositions. Light-diffuser additives include silicone particles, e.g., polymethylsilsesquioxanes available from Momentive Performance Materials under the trade name Tospearl®, crosslinked poly(methyl methacrylate) (PMMA) and other organic polymer particles, e.g., methyl methacrylate/ethyleneglycol dimethacrylate copolymers available from Sekisui Plastics Co. under the trade name TECHPOLYMER MBS®, low levels of $TiO_2$. A combination comprising at least one of the foregoing types of light diffuser additives can be used. Such diffuser particles can be added to provide light-diffusive compositions, for example in an amount of 0.05 to 10.0 wt. %, 0.2 to 3.0 wt. %, 0.2 to 2.0 wt. %, or 0.25 to 1.00 wt. % of the light diffuser additives, based on the total weight of the polymers in the in the thermoplastic compositions. In general, greater amounts of light diffuser additive is used in the manufacture of thinner articles to obtain the same degree of light diffusion. In an embodiment the light diffuser additives are silicone particles. The light diffuser additives can also be PMMA. Likewise, the light diffuser additives can be a combination of silicone particles and PMMA particles.

Methods for forming the thermoplastic compositions can vary. In an embodiment, the polycarbonate-arylate ester) copolymer, and the organophosphorus compound are combined (e.g., blended) with any additives (e.g., a mold release agent) such as in a screw-type extruder. The poly(carbonate-arylate ester) copolymer and organophosphorus compound can be combined in any order, and in form, for example, powder, granular, filamentous, as a masterbatch, and the like. The composition can then be foamed, extruded into a sheet or optionally pelletized. Methods of foaming a thermoplastic composition using frothing or physical or chemical blowing agents are known and can be used. The pellets can be used for molding into articles, foaming, or they can be used in forming a sheet of the flame retardant poly (siloxane) copolymer composition. In some embodiments, the composition can be extruded (or co-extruded with a coating or other layer) in the form of a sheet and/or can be processed through calendaring rolls to form the desired sheet.

As discussed above, the thermoplastic compositions are formulated to meet strict flammability requirements. The thermoplastic compositions have an E662 smoke test DsMax value of less than 200 when tested at a thickness of 1.5 mm or 3.0 mm, and in some embodiments can further have a value of less than 150, less than 100, less than 80, or less than 70. The thermoplastic compositions can have an E662 smoke test DsMax value of 10 to 200, 10 to 150, 30 to 100, or 30 to 80. The thermoplastic composition can further have an OSU integrated 2 minute heat release test value of less than 65 $kW\text{-}min/m^2$ and a peak heat release rate of less than 65 $kW/m^2$ as measured using the method of FAR F25.4, in accordance with Federal Aviation Regulation FAR 25.853 (d), on parts with a thickness of 1.5 or 3 mm. In some embodiments the thermoplastic composition can have an OSU integrated 2 minute heat release test value of less than 60, less than 50, less than 40 or less than 30 $kW\text{-}min/m^2$ and a peak heat release rate of less than 60, less than 50, less than 40 or less than 30 $kW/m^2$ as measured using the method of FAR F25.4, in accordance with Federal Aviation Regulation FAR 25.853 (d).

The thermoplastic composition can further have a flame time of less than 15 seconds, a burn length of less than 6 inches, and a drip extinguishing time of less than 5 seconds, each measured using the method of FAR F25.5, in accordance FAR 25.853(a). In some embodiments, the thermoplastic composition can have a flame time of less than 10 seconds, less than 8 seconds, less than 6 seconds, less than 4 seconds or less than 2 seconds, measured using the method of FAR F25.5, in accordance FAR 25.853(a) at a thickness of 1.5 or 3 mm. In some embodiments, the thermoplastic composition can have a burn length of less than 5 inch, less than 4 inch or less than 3 inch, measured using the method of FAR F25.5, in accordance FAR 25.853(a) at a thickness of 1.5 or 3 mm. In some embodiments, the thermoplastic composition can have a drip extinguishing time of less than 4 seconds, less than 3 seconds, less than 2 seconds or less than 1 second, measured using the method of FAR F25.5, in accordance FAR 25.853(a) at a thickness of 1.5 or 3 mm.

The thermoplastic copolymer compositions can further be formulated to have a haze less than 3% and a transmission greater than 85%, each measured according to ASTM D1003 using the color space CIE1931 (Illuminant C and a 2° observer) at 3 mm thickness. Generally, the thermoplastic compositions can be formulated to have lower densities, in particular a density of 1.35 g/cc or less, 1.34 g/cc or less, 1.33 g/cc or less, 1.32 g/cc or less, 1.31 g/cc or less, 1.30 g/cc or less, or 1.29 g/cc or less. The same or similar values can be obtained in articles having a wide range of thicknesses, for example from 0.1 to 10 mm, or 0.5 to 6 mm. The compositions can further have good melt viscosities, which aids processing. The thermoplastic composition can have a melt volume flow rate (MVR, cubic centimeter per 10 minutes (cc/10 min), according to ISO 1133) of 5 to 25, greater than or equal to 7, greater than or equal to 9, greater than or equal to 11, greater than or equal to 13, greater than or equal to 15, greater than or equal to 17 or greater than or equal to 19, measured at 300° C./1.2 Kg at 360 second dwell. The thermoplastic compositions can further have excellent impact properties, in particular multiaxial impact (MAI) and ductility, which provides information on how the compositions behave under multiaxial deformation conditions. The deformation applied can be a high-speed puncture. Properties reported include total energy absorbed, which is expressed in Joules (J) and ductility of parts in percent (% D) based on whether the part fractured in a brittle or ductile manner. A ductile part shows yielding where it is penetrated by the tip, a brittle part splits into pieces or has a section punched out that shows no yielding. The thermoplastic compositions can have an MAI equal to or higher than 100 J, determined at 23° C. at an impact speed of 4.4 m/second in accordance with ISO 6603 on discs with a thickness of 3.2 mm. The compositions can have a ductility in multiaxial impact of 100%, determined at 23° C. at an impact speed of 4.4 m/second in accordance with ISO 6603 on discs with a thickness of 3.2 mm. The same or similar values can be obtained in articles having a wide range of thicknesses, for example from 0.1 to 10 mm, but particularly at 0.5 to 5 mm. The compositions can also have a ductility in multiaxial impact of 100 J and ductility of 100% at lower temperatures, such as +10° C., 0° C., −10° C., −20° C., and −30° C. The thermoplastic compositions can advantageously be formulated to have high clarity, medium clarity, to be transparent, and/or to be light diffusive by adjusting the type and amount of the poly(carbonate-arylate ester) and the addition of light diffusive additives where light diffusivity is desired. Light-diffusive compositions can be used to manufacture articles that have good luminance, in which the article provides a high level of transmission of incident light (such as natural light through a window or skylight, or artificial light) with a minimum light loss by reflectance or scattering, where it is not desirable to either see the light source or other objects on the other side of the article. An article, e.g., a sheet having a high degree of hiding power (i.e., luminance) allows a significant amount of light through, but is sufficiently diffusive so that a light source or image is not discernible through the panel. The terms "high clarity," "transparent," "medium clarity," and the like are simply for convenience, and refer to the level of transmission/haze before any light diffusive additives are added to the compositions.

The thermoplastic compositions can further be formulated to have a haze less than 3%, or less than 2%, and a transmission greater than 85%, each measured using the color space CIE1931 (Illuminant C and a 2° observer) according to ASTM D 1003 (2007) at a 3 mm thickness. In some embodiments, the thermoplastic compositions can be formulated such that an article molded from the composition has both a haze less of than 3% and a transmission of greater than 85%, each measured using the color space CIE1931 (Illuminant C and a 2° observer) according to ASTM D 1003 (2007) at a 3 mm thickness.

The foregoing medium-clarity, high-clarity, and transparent compositions can be formulated to be light diffusive by the addition of a plurality of light diffuser additives as described above. For example, the light diffuser additives can comprise silicone, polymethylsilsesquioxane, cross-linked poly(methyl methacrylate), methyl methacrylate/ethyleneglycol dimethacrylate copolymer, $TiO_2$, or a combination comprising at least one of the foregoing additives. The additives, in the form of particles, can be present in an amount of 0.05 to 10 wt. %, based on the total weight of polymers in the thermoplastic composition. Alternatively, or in addition, the medium-clarity or high-clarity formulations can include 0.00002 to 5.0 wt. % of a colorant based on the total weight of the polymers in the light diffusive thermoplastic composition. For example, the high clarity formulation can comprise 0.0001 to 0.001 wt. % of a blue colorant and 0.0001 to 0.001% of violet colorant; a phosphite heat stabilizer; and a UV absorber. The blue colorant can be Pigment Blue 60 and the violet colorant can be Solvent Violet 36, the UV absorber is 2,2'-(1,4-phenylene)bis-2,2'-(1,4-phenylene)bis(4H-3,1-benzoxazin-4-one); 2-(2' hydroxy-5-t-octylphenyl)-benzotriazole; 2-(2H-benzotriazol-2-yl)4,6-bis(1-ethyl-1-phenylethylphenol; or a combination comprising at least one of the forgoing.

As mentioned throughout, the thermoplastic composition can be used in a wide variety of applications, particularly those requiring low smoke and low heat release values. Articles comprising the thermoplastic compositions can be manufactured by foaming, molding, thermoforming, extruding, or casting the thermoplastic copolymer compositions. Thus the thermoplastic composition can be used to form a foamed article, a molded article, a thermoformed article, an extruded film, an extruded sheet, one or more layers of a multi-layer article, a substrate for a coated article, or a substrate for a metallized article.

The thermoplastic compositions can be used to form a sheet. A "sheet" (which includes a film, layer, and the like) can be a shaped or unshaped, and is a molded, formed, or extruded article of substantially uniform thickness (e.g., 0.001 to 10.0 cm) and which is unshaped or is further shaped. For example in an operation to make a sheet, the molten thermoplastic composition (e.g., a thermoplastic composition that has been heated to a temperature greater than a glass transition temperature (Tg) of the thermoplastic composition) can be extruded from a slot die. Twin or single screw extruders and be used. Single or multi-manifold dies can be used. The extrusion temperatures of 200 to 320° C., specifically 260 to 310° C., and more specifically 270 to 290° C. The molten thermoplastic composition can then be passed through a nip (e.g., a space formed between two calendaring rolls), which when cooled can form the sheet.

The temperature for the cooling rolls can be the same or different, for example the temperature of the rolls can be from 80 to 175° C., specifically 100 to 160° C., and more specifically 105 to 150° C. After passing through the nip, the thermoplastic composition can be cooled (e.g., to a temperature less than the Tg of the thermoplastic composition), and can then be passed through pull rolls. A mask can optionally be applied to the cooled sheet to protect the sheet 60 from damage or contamination. The sheet can be cut into lengths suitable for handling.

In various embodiments, the calendaring roll(s) can comprise a polished roll (e.g., a chrome or chromium plated roll) or a textured roll (e.g., a roll comprising an elastomeric material (e.g., an EPDM (ethylene propylene diamine monomer) based rubber)). Suitable materials for the rolls include plastic, metal (e.g., chrome, stainless steel, aluminum, and the like), rubber (e.g., EPDM), ceramic materials, and the like. The size of the rolls, material of the rolls, number of rolls, the film wrap around the rolls, and the like, can vary with the system employed. Processing conditions (e.g., the temperature of the calendaring rolls, the line speed, nip pressure, and the like) can also be varied, depending on the properties of the thermoplastic compositions used.

The sheet can comprise a cap layer to provided additional properties desirable in the sheet. In an embodiment, the cap layer can be a hard coat, defined herein as a coating applied to the sheet to enhance scratch and abrasion resistance, chemical resistance, or other desirable surface properties. Cap layers can also include a UV blocking layer applied to provide optical properties such as enhanced weatherability for underlying layers.

In an embodiment, the sheet comprising the thermoplastic composition further comprises as a cap layer, a hard coat disposed on a surface of the sheet layer. In another embodiment, the sheet comprises as a cap layer, a UV blocking layer disposed on a surface of the sheet. Alternatively, a multilayer article comprises the sheet comprising the thermoplastic compositions, a first layer a UV blocking cap layer disposed on a first side of the sheet, and a second layer a UV blocking layer cap layer disposed on a second, opposite side of the sheet. In another embodiment, a multilayer article comprises the sheet comprising the thermoplastic compositions, a first hard coat cap layer disposed on a first side of the sheet, and a second hard coat cap layer disposed on a second, opposite side of the sheet. A first UV blocking layer can optionally further be disposed between the sheet and the first cap layer, and a second UV blocking layer can further be optionally disposed between the opposite side of the sheet and the second hard coat cap layer. Where more than one hard coat or UV blocking cap layer is disposed on the sheet, each layer can be the same or different from the cap layer on the opposing surface.

Figure 2:
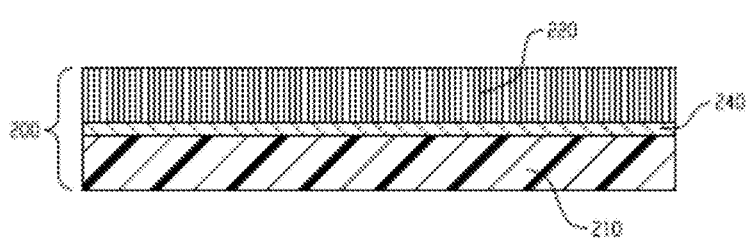
FIG. 2 is a diagram of a hard coated sheet.

Other layers can be present in the multilayer sheets. In an embodiment, in FIG. 1, a hard coated sheet 100 comprises a sheet layer 110 comprising the thermoplastic composition, and a layer 120 comprising a hard coat. In another embodiment, in FIG. 2, a hard coated sheet 200 comprises a sheet layer 210 comprising the thermoplastic composition, a hard coat layer 220, and a primer layer 240 disposed between the sheet layer 210 comprising the thermoplastic composition and the hard coat layer 220. As used herein, where a layer is disposed on another layer it will be understood that the layers are in at least partial contact with each other.

While any suitable method of forming a multilayer article comprising the thermoplastic composition can be used (e.g., thermoforming, vacuum forming, pressure forming, coextrusion, laminating, profile extrusion, blow molding, compression molding, injection molding, and the like), in an embodiment the multilayer articles can be formed by coextrusion or thermoforming. The term "thermoforming" refers to a method comprising the sequential or simultaneous heating and forming of a material onto a mold, wherein the material is originally in the form of a sheet, and can then be formed into a desired shape, for example a window. Once the desired shape has been obtained, the formed article (e.g., a component of an aircraft window) is cooled below its Tg. Thermoforming methods that can be used include mechanical forming (e.g., matched tool forming), membrane assisted pressure/vacuum forming, membrane assisted pressure/vacuum forming with a plug assist, and the like.

Hard coats are manufactured from a hard coat composition that has a hardness after cure that is harder than the hardness of the over-coated article. Desirably, hard coats are also transparent and colorless, and still more desirably, can protect the underlying coated article from exposure to ultraviolet radiation. In an embodiment, the hard coat provides scratch resistance. Hard coats are generally thermosetting, but can be thermoformable or non-thermoformable. A non-thermoformable hard coat can be applied after the article to be hard coated has been shaped to its final shape, whereas a thermoformable hard coat can be applied prior to shaping (e.g., thermoforming, etc.) by coextruding, coating, or other suitable methods, and is subsequently cured to its desired final hardness during or after shaping to form the article. Hard coats can be a single layer hard coat having sufficient scratch resistance. Hard coats comprise curable (i.e., cross-linkable) polymers, and can be based on hydroxy-containing organic polymers such as novolacs, organosilioxane polymers such as polysilsesquioxane copolymers, acrylates, or a combination comprising at least one of the foregoing. Additives can be included in the coating composition can be included to add or enhance the properties of the hard coat, for example a filler such as silica can be used to increase hardness. Other additives include methyl vinyl cycloalkyl cure retardants which bind the platinum at room temperature to prevent early cure, but release the platinum at higher temperatures to affect cure; ultraviolet absorbers (UVAs) such as benzotriazoles and hydroxybenzophenones, silylated UVAs such as 4,6-dibenzoyl-2-(trialkoxysilylalkyl) resorcinols and 4-(triethoxysilane)propoxy-2-hydroxybenzophenone. In another embodiment, a coating composition is a UV absorbing layer comprising polycarbonate, and additional polymer such as poly(1,4-cyclohexylidene cyclohexane-1,4-dicarboxylate) (PCCD). Additives, where used, can be present in an amount of 0.1 to 20 wt. %, based on the total weight of the polymer. In an embodiment, the sheet or multilayer sheet can have a color shift of less than or equal to 4 yellowness index (YI) units when exposed to UV light, or in other words, the change in yellowness index dYI can be less than or equal to 4, as 40 measured according to ASTM D1 1925-70.

The hard coat composition further comprises a solvent, such as water, or a branched or straight chain $C_{1-12}$ alcohol, ether alcohol, diol, polyol, or ethyl acetate, or other $C_{1-12}$ organic solvent miscible with these alcohols. Once coated, the hard coat layer is dried to form the uncured hard coat, and can be cured thermally, or by photoinitiation, for example wherein the hard coat composition comprises a photolytic cure catalyst and curable groups reactive with the cure catalyst.

A primer layer can be disposed on the article to be coated prior to the hard coat layer. Useful primer layers include those based on copolymers comprising $C_{1-12}$ alkyl(meth) acrylates, (meth)acrylic acid, substituted methacrylates such as hydroxyalkyl(meth)acrylates, silane substituted methacrylates including alkoxysilane substituted methacrylates, epoxy-substituted methacrylates, and the like. Other non-(meth)acrylate monomers co-polymerizable with the (meth) acrylate monomers including styrenes, $C_{2-12}$ olefins, $C_{2-12}$ vinyl ethers, $C_{1-12}$ (meth)acrylamides, meth(acrylonitrile), and the like.

Multi-layered shaped articles can alternatively be formed by injection molding the thermoplastic composition onto a single or multi-layer film or sheet substrate as follows: (a) providing a single or multi-layer thermoplastic substrate optionally having a color on the surface, for instance, using screen printing or a transfer dye; (b) conforming the substrate to a mold configuration such as by forming and trimming the substrate into a three-dimensional shape and fitting the substrate into a mold having a surface which matches the three dimensional shape of the substrate; (c) injecting the thermoplastic composition into the mold cavity behind the substrate to produce a one-piece, permanently bonded three-dimensional product or (ii) to transfer a pattern or aesthetic effect from a printed substrate to the injected resin and (d) removing the printed substrate, thus imparting the aesthetic effect to the molded thermoplastic composition.

The article comprising the thermoplastic compositions can be a metallized article, for example a substrate comprising the thermoplastic compositions, having a first side and a second side opposite the first side, with a metal layer disposed on the first side of the substrate. The substrate can be of any shape, for example a film. Examples of metals that can be deposited on the substrate include aluminum, copper, silver, gold, steel, brass, tin, or alloys comprising at least one of the foregoing. Metallizing typically involves a two-step process, comprising creating a metallized transfer layer, and applying metallized layer of the transfer layer to a side of the substrate. For example, a transfer layer can be coated with a protective layer. Metallic particles are then deposited onto the protective layer by vacuum deposition, for example, or other methods. In a second step, an adhesive coating is applied to the substrate comprising the thermoplastic compositions, whereupon the transfer layer coated with the metal, is adhered to the substrate, with the metallic layer adjacent the adhesive coating. After heating the various layers, the transfer layer is removed to provide a metallic-coated substrate comprising the thermoplastic compositions, and having a protective layer. The metal layer resulting from the metallizing process (e.g., by vapor deposition) can be broaden this range 0.001 to 50 micrometers (μm) thick. The metallized substrate can have a protective layer disposed on the second side of the substrate.

Those skilled in the art will also appreciate that common curing and surface modification processes including heat-setting, texturing, embossing, corona treatment, flame treatment, plasma treatment, and vacuum deposition can further be applied to the above articles to alter surface appearances and impart additional functionalities to the articles.

In an embodiment, the thermoplastic composition is used to prepare a window article for an aircraft, comprising a frame and a sheet comprising the thermoplastic composition supported by the frame. "Supported by" means the window article is in contact with and is fixed or movable with respect to the frame, and where the frame can be fixed or movable with respect to a surrounding element (such as, for example, a fuselage of an aircraft), such that the frame is intervening between the window article and surrounding element, and the sheet does not directly contact the surrounding element. In an embodiment, a window comprises the window article. In an embodiment, window article can be a component of a window for an aircraft, or a window for an aircraft, for example a window in a military aircraft, such as for the canopy of a jet fighter aircraft, or in aircraft windows for commercial passenger aircraft. Window articles can be transparent, translucent, or opaque, and can be fixed or movable relative to the window. In an embodiment, a window article can be a transparent or opaque interior covering for an aircraft window. An exemplary transparent window article is a "dust cover," which is fixed relative to the window. In another embodiment, an opaque window article that is movable relative to the window is a window shade. In an embodiment, a transparent window article is an interior covering, also referred to herein as a "dust cover" for the interior section of an aircraft window. The dust cover can be used for aircraft windows for a commercial or non-commercial (i.e., military) passenger aircraft, or for a cargo transport aircraft as desired.

Aircraft windows can comprise at least three elements: an outer window pane, an inner window pane, and the dust cover. In an embodiment, in FIG. 3, a window for a commercial aircraft 300 comprises an outer window pane 310, an inner window pane 320, and a dust cover 330. The outer window pane 310 and inner window pane 320 are generally thicker than the dust cover 330 and are thus engineered to be load bearing where the outer window 310 and the inner window 320 are structural members of the fuselage of the aircraft. The outer window pane 310 is additionally part of the pressurized envelope of the aircraft fuselage. The dust cover 330 protects the inner window pane 320 and outer window pane 310 from damage.

Figure 3:
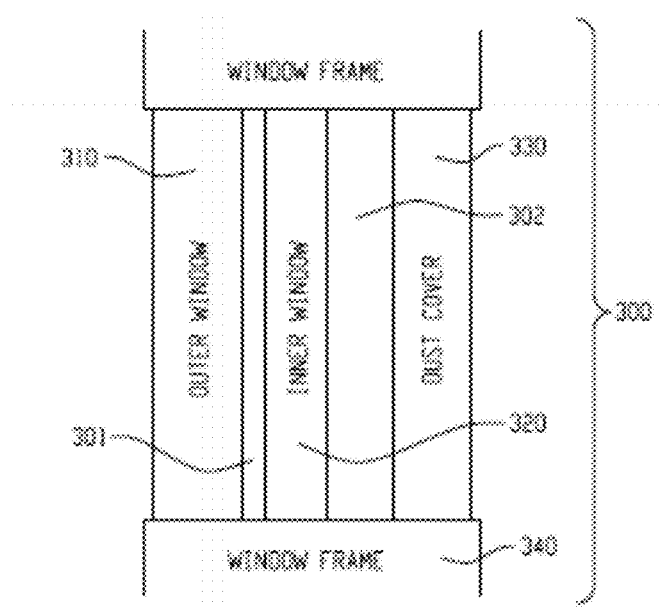
FIG. 3 is a diagram of a window article for an aircraft.

Also in FIG. 3, the inner window pane 320 and outer window pane 310 can be formed from the thermoplastic composition or another composition, for example an acrylic polymer composition. The dust cover 330 can be manufactured the thermoplastic composition described herein. It can be advantageous to hard coat the dust cover 330 to increase the scratch resistance of the dust cover 330, and to thereby increase the interior transparency, hardness, and smoke release capability of dust cover 330. Inner window pane 320 and outer window pane 310 are separated by a space 301, and inner window 320 and dust cover 330 are also separated by a space 302. The outer window pane 310, inner window pane 320, and dust cover 330 are each contacted by their edges to a frame 340, such that the frame 340 provides support for and holds in place the outer window pane 310, inner window pane 320, and dust cover 330. In another embodiment, windows structures for commercial aircraft can also further contain a moveable shade (not shown) that allows the passenger to block outside light.

Figure 4:
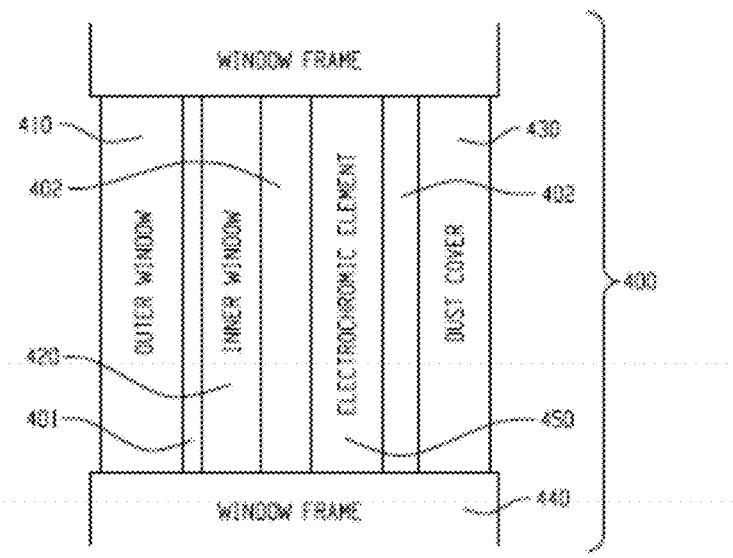
FIG. 4 is a diagram of a window article for an aircraft.

In another embodiment, a window for a commercial passenger aircraft can comprise at least four major elements as shown in FIG. 4. The window comprises an outer window pane 410 comprising a transparent material, an inner window pane 420 comprising a transparent material, and dust cover 430. The outer window pane 410 and inner window pane 420 are thicker and are engineered to be load bearing, where at least the outer window element a part of the pressurized envelope of the aircraft fuselage. The dust cover 430 can be prepared from the thermoplastic composition. It can be advantageous to hard coat the dust cover 430 to increase the scratch resistance of the dust cover 430, and to thereby increase the interior transparency, hardness, and smoke release capability of the dust cover 430. Inner window 420 and outer window 410 are separated by a space 401, and inner window pane 420 and dust cover 430 are also separated by a space 402. The outer window pane 410, inner window pane 420, and dust cover 430 are each contacted by their edges to a frame 440, such that the frame 440 provides support for and holds in place the outer window pane 410, inner window pane 420, and dust cover 430. The frame 440 holding the outer window pane 410 and the inner window pane 420 can be the same as or different from the frame holding the dust cover 430. The dust cover protects the inner and outer element from damage. In lieu of a moveable shade to block the light, an electrochromic element 450 can be included. In an example, the electrochromic element 450 can be inserted between the inner window pane 420 and the dust cover 430, in space 402.

The thermoplastic composition for use in the window panes or dust covers can further be tinted using standard dyes and pigments. The thermoplastic composition can be formed into the window pane or dust cover by extrusion of a sheet (followed by optionally thermoforming) or injection molding. Optionally where needed the window pane or dust cover can be hard coated one or both sides using the hard coat and primer layers described above. The hard coats can be applied to the sheet after extrusion or to the formed window. The dust cover can have a thickness of about 1 to about 4 mm.

Figure 5:
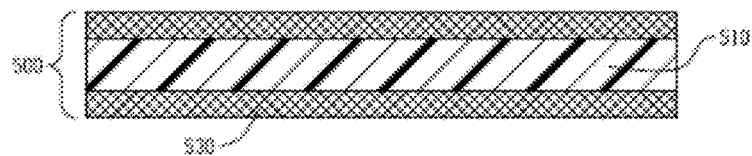
FIG. 5 is a diagram of a multilayer article.

In another embodiment, a multilayer article 500 comprises a sheet 510 comprising the thermoplastic composition and a UV blocking layer 530 disposed on a surface of the sheet 510 as shown in FIG. 5. UV blocking layer 530 is UV stable such that it does not substantially shift in color on exposure to UV light of a wavelength of 275 to 410 nm. In addition, the UV blocking layer 530 is of a sufficient thickness to provide the desired UV protection to substantially prevent the incident light from causing a photo degradation in the sheet layer 510 comprising the thermoplastic composition, but is present in a film thickness that does not cause the multilayer article 500 to fail the heat release or smoke testing requirements set forth herein. In a specific embodiment, a second UV blocking layer is optionally co-extruded on the side of the sheet comprising the thermoplastic composition opposite the first UV blocking layer. In another embodiment, the multilayer article can comprise an additional layer (not shown) on a side of the sheet layer comprising the thermoplastic composition 510 opposite UV blocking layer 530. In a specific embodiment, the additional layer is a UV blocking layer. In another embodiment, the article comprising the sheet layer comprising the thermoplastic composition 510 has a reflective layer disposed on a side opposite the UV blocking layer 530. In another embodiment, the sheet layer comprising the thermoplastic composition 510 has a reflective layer disposed between the sheet layer comprising the thermoplastic composition 510 and UV blocking layer 530.

In a specific embodiment, the multilayer article 500 of FIG. 5, is opaque. For the opaque sheet, pigments and colorants can be added to either the thermosetting composition or the UV blocking layer, or both. In addition, fillers such as, for example, glass and/or mica can be added to one or more of these layers. Addition of such fillers can also increase Young's modulus of the sheet layer comprising the thermoplastic composition 510 and thereby can increase Young's modulus of the article, whereas addition of fillers to the UV blocking layer can decrease the gloss of sheet.

In another specific embodiment, the multilayer article 500 is a transparent article having a high transparency by having either a high percent transmittance or a low haze, or both. For the transparent sheet, low levels of pigments and colorants can be added to either the thermosetting composition or the UV blocking layer, or both.

In another embodiment, the multilayer article 500 is a thermoformable, light-diffusive article having a high degree hiding power in combination with good luminance. For the diffusive article, low levels pigments and colorants can be added to either the sheet layer comprising the thermoplastic composition 510, the UV blocking layer 530 or both. To obtain the diffusive optical requirements the appropriate about of a diffusive agent can be added to sheet layer comprising the thermoplastic composition 510 or the UV blocking layer 530.

Figure 6:
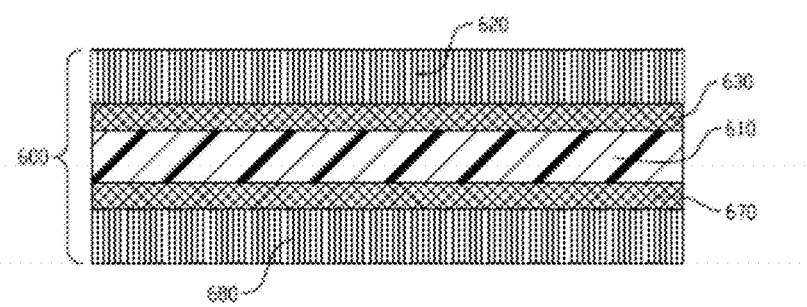
FIG. 6 is a diagram of a multilayer article.

In another embodiment, a multilayer article 600 shown in FIG. 6, comprises a sheet layer comprising the thermoplastic composition 610 (which meets at least the heat release criteria disclosed herein), a UV blocking layer 630 disposed on a surface of the sheet layer comprising the thermoplastic composition 610, and a hard coat layer 620 disposed on a surface of the UV blocking layer 630 opposite the sheet layer comprising the thermoplastic composition 610. The hard coat layer 620 can further comprise a primer layer (640, not shown) disposed between the hard coat 620 and the UV blocking layer 630. The UV blocking layer 630 is UV stable such that it does not substantially shift in color on exposure to UV light of a wavelength of 275 to 410 nm. In addition, the UV blocking layer 630 is of a sufficient thickness to provide the desired UV protection to substantially prevent incident light from causing a photo degradation in the sheet layer comprising the thermoplastic composition 610, but is present in a film thickness that does not cause the multilayer article 600 to fail the heat release or smoke testing requirements described herein. The UV blocking layer 630 can, in an embodiment, comprise the thermoplastic compositions, a polycarbonate homopolymer, polycarbonate copolymer, branched polycarbonate, or a blend comprising at least one of the foregoing polycarbonates. Optionally, the UV blocking layer 630 can contain an effective amount of a UV absorber for example, as a cap layer. The UV absorber levels for cap layers can be present at 0.5 to 15 wt. % and preferable 4.0 to 8.0 wt. %. The UV absorbers can be selected from the class of benzotriazoles, benzophenones, triazines, benzoxazinones, and cyanoacrylates. Some non-limiting examples include CYASORB™ UV-3638 (Cytec), CYASORB™ UV-1164 (Cytec), CYASORB™ 5411 (Cytec), TINUVINT™ 1577 (Ciba), TINUVINT™ 360 (Ciba), TINUVINT™ 234 (Ciba), UVINUL™ 3030 (BASF) and 4,6-dibenzoylresorcinol. Optionally, the UV blocking layer can contain an effective amount of a flame retardant. In a specific embodiment, where improved chemical resistance is needed, the UV blocking layer comprises a blend with a polyester, such as poly(1,4-cyclohexylene dimethylene-1,4cyclohexanedicarboxylate) (PCCD). Hard coat layer 620 is added to provide a scratch and mar resistance to the sheet or film, and can be applied to one or both sides. In an exemplary embodiment, suitable hard coats include AS4000 or AS4007 silicone hard coats, both available from GE Silicones.

In another specific embodiment, a multilayer article 600 is a scratch and mar resistant opaque article with substantially the same properties as the above opaque article 500, except that the article comprises a hard coat. The hard coat layer 620, can be applied to one or both exposed sides of the sheet layer 610 comprising the thermoplastic composition, and desirably does not significantly adversely affect the properties of the sheet layer 610 comprising the thermoplastic composition. In another specific embodiment, a multilayer article 600 is an opaque article having a hard coat 620, wherein the hard coat is thermoformable.

In another specific embodiment, the multilayer sheet 600 is a scratch and mar resistant, transparent article comprising a thermally cured hard coat. In applications in which UV is expected from both sides of the article, the UV blocking layer 630 can be applied to both sides of the article. This is also useful to prevent the installation of the incorrect side of the sheet layer 610 comprising the thermoplastic composition, towards the UV light. In another specific embodiment, a multilayer article 600 is a scratch and mar resistant formable transparent article comprising a thermoformable hard coat layer 620.

In another embodiment, a multilayer article 600 is a scratch and mar resistant, diffusive article comprising a hard coat layer 620 that is thermally curable. In another specific embodiment, a multilayer sheet comprises a scratch and mar resistant formable, diffusive sheet comprising a hard coat layer 620 that is thermoformable.

The multilayer article 600 can be prepared by coextrusion, laminating, calendaring, or injection molding, or other method suitable for preparing a multilayer article. In a specific embodiment, the multilayer article is prepared by coextrusion. Further, the hard coat layer 620 as disposed on the UV blocking layer 630 can also be coextruded, spray coated, dip coated, curtain coated, and the like, or otherwise coating using a suitable coating method for providing a hard coat. The hard coat layer, when applied using an application method such as spray coating dip coating, curtain coating, or the like, can be subsequently dried by air drying, oven drying, vacuum drying, or a combination of these to form a pre-cured layer. The pre-cured layer is then cured to form the hard coat layer using thermal cure, radiation cure, or a combination comprising at least one of these, to affect the cure of the hard coat layer 620. The multilayer article 600 can be thermoformed. In an embodiment, the hard coat layer 620 is partially cured prior to thermoforming the sheet or film, and the hard coat layer is fully cured during or after thermoforming. In another embodiment, the hard coat layer 620, is applied to a partial sheet or film comprising sheet layer comprising the thermoplastic composition 610 and UV blocking layer 630. In another embodiment, the multilayer article 600 can optionally comprise an additional layer 670 on a side of sheet layer 610 comprising the thermoplastic composition, opposite UV blocking layer 630. In an embodiment, the additional layer 670 is a UV blocking layer (e.g., 630). In another embodiment, the multilayer article can further optionally comprise a second additional layer 680. In another embodiment, the second additional layer 680 is a hard coat (e.g. 620).

Figure 7:
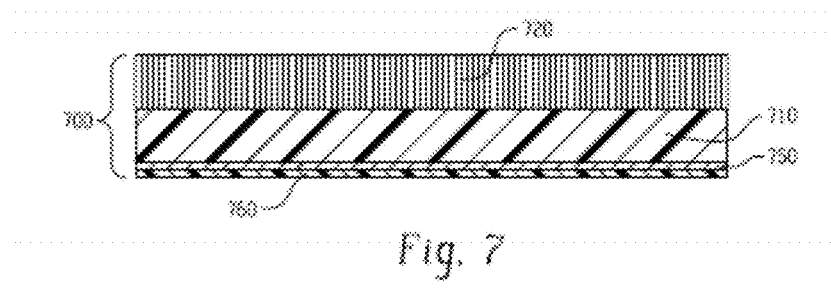
FIG. 7 is a diagram of a plastic mirror.

In another embodiment as shown in FIG. 7, a plastic mirror comprising the thermoplastic composition is also provided. The mirror 700 comprises a sheet layer 710 comprising the thermoplastic composition, a hard coat 720 disposed on a surface of the sheet, and an opacifying layer 750, e.g., a metal layer disposed on a surface of the sheet layer 710 comprising the thermoplastic composition, opposite the hard coat layer 720. The hard coat layer 720 can further comprise a primer layer (740, not shown) disposed between the hard coat layer 720 and the sheet layer 710 comprising the thermoplastic composition. Optionally, a UV layer (730, not shown) is disposed between the hard coat layer 720 and the sheet layer 710 comprising the thermoplastic composition. In an embodiment, the opacifying layer 750 is a metal layer, comprising aluminum, wherein the aluminum is applied to the sheet layer 710 comprising the thermoplastic composition, using a method designed to provide a high optical quality such as sputtering or vapor deposition under high vacuum. The opacifying layer 750, for example, the metal layer, can have a thickness of 2 to 50 nm. A protective layer 760 can optionally be applied a surface of the opacifying layer 750 opposite the sheet layer 710 comprising the thermoplastic composition, to protect the opacifying, e.g., metal layer 750 from abrasion.

Illustrative articles include access panels, access doors, air flow regulators, air gaspers, air grilles, arm rests, baggage storage doors, balcony components, cabinet walls, ceiling panels, door pulls, door handles, duct housings, enclosures for electronic devices, equipment housings, equipment panels, floor panels, food carts, food trays, galley surfaces, grilles, handles, housings for TVs and displays, light panels, magazine racks, telephone housings, partitions, parts for trolley carts, seat backs, seat components, railing components, seat housings, shelves, side walls, speaker housings, storage compartments, storage housings, toilet seats, tray tables, trays, trim panel, window moldings, window slides, windows, balusters for stairs and balconies, covers for life vests, covers for storage bins, dust covers for windows, layers of an electrochromic device, lenses for televisions, electronic displays, gauges, or instrument panels, light covers, light diffusers, light tubes and light pipes, mirrors, partitions, railings, refrigerator doors, shower doors, sink bowls, trolley cart containers, trolley cart side panels, and the like. The thermoplastic composition is particularly useful in aircraft, specifically a variety of aircraft compartment interior applications. The articles manufactured from the compositions described herein can thus be an aircraft component. In a specific embodiment the articles are interior components for aircraft, including access panels, access doors, access door panels, access door panel call buttons, light covers, light bezels, air flow regulators, baggage storage doors, display panels, display units, door handles, door pulls, enclosures for electronic devices, food carts, food trays, trolley carts, trolley side walls, grilles, handles, stow bin components, magazine racks, seat components, partitions, mirrors, refrigerator doors, seat backs, arm rests, foot rests, side walls, tray tables, trim panels, windows, window dust covers, and the like. The thermoplastic compositions can be formed (e.g., molded) into sheets that can be used for any of the above mentioned components. It is generally noted that the overall size, shape, thickness, optical properties, and the like of the polycarbonate sheet can vary depending upon the desired application.

The aircraft components can be hard coated and light-diffusive. Examples of light-diffusive aircraft components include partitions (which includes dividers), including bulkhead partitions, and light covers (which includes light domes).

Examples of medium clarity aircraft components include trolley sidewalls, access doors, and access panels.

Examples of high clarity aircraft components include window panes, window dust covers, partitions (which included dividers), light covers (which includes light domes), and glass replacements, for example electronics screens (e.g., a screen for an in-flight entertainment device) and covers for display panels, gauges and plastic mirrors, i.e., transparent sheets that have been rendered opaque on one side, for example by metallization.

The aircraft components can be high impact or medium impact as defined above. In either embodiment the articles can be of good colorability. Examples of high-impact aircraft components include panels for access doors and components of trolley carts.

Examples of high-impact aircraft components where good colorability is desired include interior aircraft parts such as stow bin components, magazine racks, seat back components, components of trolley carts, and access door panels.

Examples of medium-impact aircraft components where good colorability is desired include call buttons, light bezels, door pulls, door handles, arm rests, seat components, and foot rests.

The aircraft components can be of good colorability. Examples of high-impact aircraft components include panels for access doors and components of trolley carts.

The aircraft components can be a transparent flame retardant article, such as a sheet. With regard to the transparency of the sheet, end user specifications (e.g., commercial airline specifications) generally specify that the component satisfy a particular predetermined threshold. Haze values, as measured using the color space CIE1931 (Illuminant C and a 2° observer), or by ANSI/ASTM D1003-00, Procedure A, illuminant C, can be a useful determination of the optical properties of the transparent flame retardant polycarbonate articles such as a sheet. The lower the haze levels, the better the transparency of the finished article.

The transparent thermoplastic compositions have special utility in applications requiring clarity, for example any of the above articles or components can be manufactured using the transparent thermoplastic compositions disclosed herein. In an embodiment, the transparent thermoplastic compositions are used for the manufacture of balcony components, balusters for stairs and balconies, ceiling panels, covers for life vests, covers for storage bins, dust covers for windows, layers of an electrochromic device, lenses for televisions, electronic displays, gauges, or instrument panels, light covers, light diffusers, light tubes and light pipes, mirrors, partitions, railings, refrigerator doors, shower doors, sink bowls, trolley cart containers, trolley cart side panels, windows, or the like, particularly in aircraft.

Any of the foregoing articles, but in particular the transparent articles, can further have a hardcoat disposed on a surface of the article to enhance abrasion and scratch resistance, chemical resistance, and the like. Hardcoats are known in the art, and include, for example, various polyacrylates such as hyperbranched polyacrylates, silicones, polyfluoroacrylates, urethane-acrylates, phenolics, perfluoropolyethers, and the like.

In one embodiment, provided herein is an aircraft component wherein the aircraft component is a molded, formed, or extruded component, comprising a thermoplastic composition comprising, based on the total weight of the composition, 90 to 97.5 wt. % of a poly(carbonate-arylate ester); 2.5 to 10 wt. % of an aromatic organophosphorus compound such as BPADP or RDP; optionally, up to 5 wt. % of an additive composition comprising an additive selected from a processing aid, a heat stabilizer, an ultra an additive composition comprising an additive selected from a processing aid, a heat stabilizer, an ultra violet light absorber, a colorant, or a combination comprising at least one of the foregoing, wherein a sample of the thermoplastic composition has an OSU integrated 2 minute heat release test value of less than 65 kW-min/m² and a peak heat release rate of less than 65 kW/m², each measured using the method of FAR F25.4, in accordance with FAR 25.853 (d) at a thickness of 1.5 mm or 3 mm, an E662 smoke test DsMax value of less than 200 when measured at a thickness of 1.5 mm or 3 mm, a flame time of less than 15 seconds, a burn length of less than 6 inches, and a drip extinguishing time of less than 5 seconds, each measured using the method of FAR F25.5, in accordance FAR 25.853(a) at a thickness of 1.5 mm or 3 mm, a multiaxial impact energy of 100 J or higher and a ductility of 100%, measured at +23° C. at an impact speed of 4.4 m/second in accordance with ISO 6603 on 3.2 mm thick discs, optionally the component has a transmission of 85% or more and a haze of 3% or less, measured according to ASTM D1003 using the color space CIE1931 (Illuminant C and a 2° observer) at a thickness of 3 mm, and optionally the thermoplastic composition has a melt volume rate of greater than 5 cc/10 min and less than 25 cc/10 min measured at 300° C. under 1.2 kg force measured according to ISO 1133.

In an embodiment, the poly(carbonate-arylate ester) comprises 2 to 20 mol % of bisphenol-A carbonate units, 60 to 98 mol % of isophthalic acid-terephthalic acid-resorcinol ester units, optionally, 1 to 20 mol % of resorcinol carbonate units, isophthalic acid-terephthalic acid-bisphenol-A ester units, or a combination comprising at least one of the foregoing.

In another embodiment, the poly(carbonate-arylate ester) comprises 1 to 40 mol % of bisphenol A carbonate units, 50 to 95 mol % of isophthalic acid-terephthalic acid-resorcinol units, and siloxane units in an amount effective to provide 0.1 to 10 wt. % of siloxane units, based on the weight of the poly(carbonate-arylate ester), wherein the siloxane units are of the formula

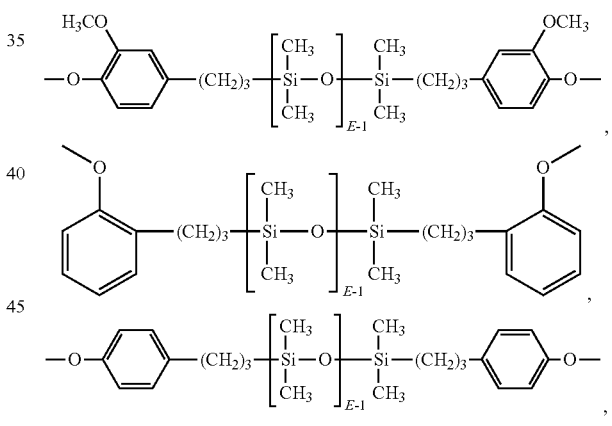

or a combination comprising at least one of the foregoing (specifically of formula 9b-2), wherein E has an average value of 2 to 90, 2 to 50, or 2 to 30.

The poly(carbonate-arylate ester) can also comprise a combination comprising, based on the total weight of the poly(carbonate-arylate ester)s, 20 to 80 wt. % of a poly (bisphenol-A carbonate)-co-poly(isophthalate-terephthalate-resorcinol ester) comprising units of the formula

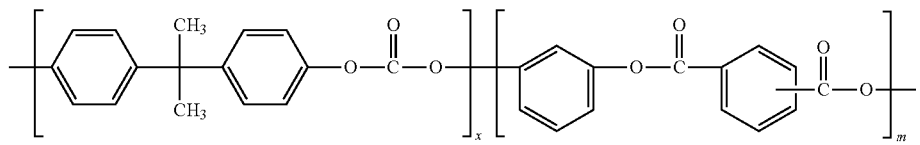

wherein m is 4 to 100, and the mole ratio of x:m is 99:1 to 1:99; and 20 to 80 wt. % of the poly(bisphenol-A carbonate)-co-poly(isophthalate-terephthalate-resorcinol ester)-co-poly(siloxane).

In another embodiment, a light-diffusive aircraft component selected from a partition and a light cover, is molded or formed from a thermoplastic polymer composition comprising, based on the total weight of the composition, 90 to 97.5 wt. % of a poly(carbonate-arylate ester); 2.5 to 10 wt. % of an aromatic organophosphorus compound such as BPADP or RDP; and optionally, up to 5 wt. % of an additive composition comprising an additive selected from a processing aid, a heat stabilizer, an ultra violet light absorber, a colorant, or a combination comprising at least one of the foregoing, and 0.05 to 10 wt. % of a light diffuser additive, based on the total weight of polymers in the thermoplastic polymer composition; wherein a molded or formed sample of the thermoplastic polymer composition has a transmission of 20% to 90% or a haze of 70% to 99.9%, each measured according to ASTM D1003 using the color space CIE1931 (Illuminant C and a 2° observer) at 3 mm thickness, an OSU integrated 2 minute heat release test value of less than 65 kW-min/m$^2$ and a peak heat release rate of less than 65 kW/m$^2$, each measured using the method of FAR F25.4, in accordance with FAR 25.853 (d) at a thickness of 1.5 mm or 3 mm, an E662 smoke test DsMax value of less than 200 when measured at a thickness of 1.5 mm or 3 mm, a flame time of less than 15 seconds, a burn length of less than 6 inches, and a drip extinguishing time of less than 5 seconds, each measured using the method of FAR F25.5, in accordance FAR 25.853(a) at a thickness of 1.5 mm or 3 mm, a multiaxial impact energy of 100 J or higher and a ductility of 100%, measured at +23° C. at an impact speed of 4.4 m/second in accordance with ISO 6603 on 3.2 mm thick discs, and optionally, a melt volume flow rate of greater than 5 cc/10 min measured at 300° C. under 1.2 kg force according to ISO 1133.

In still another embodiment, an aircraft component selected from a trolley sidewall, an access door, or an access panel, is molded or formed from a thermoplastic polymer composition comprising, based on the total weight of the composition, 90 to 97.5 wt. % of a poly(carbonate-arylate ester); 2.5 to 10 wt. % of an aromatic organophosphorus compound such as BPADP or RDP; and optionally, up to 5 wt. % of an additive composition comprising an additive selected from a processing aid, a heat stabilizer, an ultra violet light absorber, a colorant, or a combination comprising at least one of the foregoing, wherein a molded or formed sample of the thermoplastic polymer composition has a transmission of 70% to 87% or a haze of 2% to 10%, each measured according to ASTM D1003 using the color space CIE1931 (Illuminant C and a 2° observer) at 3 mm thickness, an OSU integrated 2 minute heat release test value of less than 65 kW-min/m$^2$ and a peak heat release rate of less than 65 kW/m$^2$, each measured using the method of FAR F25.4, in accordance with FAR 25.853 (d) at a thickness of 1.5 mm or 3 mm, an E662 smoke test DsMax value of less than 200 when measured at a thickness of 1.5 mm or 3 mm, a flame time of less than 15 seconds, a burn length of less than 6 inches, and a drip extinguishing time of less than 5 seconds, each measured using the method of FAR F25.5, in accordance FAR 25.853(a) at a thickness of 1.5 mm or 3 mm, a multiaxial impact energy of 100 J or higher and a ductility of 100%, measured at +23° C. at an impact speed of 4.4 m/second in accordance with ISO 6603 on 3.2 mm thick discs, and optionally, a melt volume flow rate of greater than 5 cc/10 min measured at 300° C. under 1.2 kg force according to ISO 1133.

In still another embodiment, an aircraft component, selected from a window, window dust cover, partition, light cover, electronics screen, display cover, or plastic mirror, is molded or formed from a thermoplastic polymer composition comprising, based on the total weight of the composition, 90 to 97.5 wt. % of a polycarbonate-arylate ester); 2.5 to 10 wt. % of an aromatic organophosphorus compound such as BPADP or RDP; and optionally, up to 5 wt. % of an additive composition comprising an additive selected from a processing aid, a heat stabilizer, an ultra violet light absorber, a colorant, or a combination comprising at least one of the foregoing, wherein a molded or formed sample of the thermoplastic polymer composition has a transmission of 85% or more or a haze of 3% or less, each measured according to ASTM D1003 using the color space CIE1931 (Illuminant C and a 2° observer) at 3 mm thickness, an OSU integrated 2 minute heat release test value of less than 65 kW-min/m$^2$ and a peak heat release rate of less than 65 kW/m$^2$, each measured using the method of FAR F25.4, in accordance with FAR 25.853 (d) at a thickness of 1.5 mm or 3 mm, an E662 smoke test DsMax value of less than 200 when measured at a thickness of 1.5 mm or 3 mm, a flame time of less than 15 seconds, a burn length of less than 6 inches, and a drip extinguishing time of less than 5 seconds, each measured using the method of FAR F25.5, in accordance FAR 25.853(a) at a thickness of 1.5 mm or 3 mm, a multiaxial impact energy of 100 J or higher and a ductility of 100%, measured at +23° C. at an impact speed of 4.4 m/second in accordance with ISO 6603 on 3.2 mm thick discs, and optionally, a melt volume flow rate of greater than 5 cc/10 min measured at 300° C. under 1.2 kg force according to ISO 1133.

In still another embodiment, an aircraft component, selected from an access door panel, an access door panel call button, a seat component, a stow bin component, a magazine rack, a component of a stow bin, a magazine rack, a seat component, a trolley cart, a component of a trolley cart, a light bezel, a door pull, a door handle, an arm rest or a foot rest, is molded or formed from a thermoplastic polymer composition comprising from a thermoplastic polymer composition comprising, based on the total weight of the composition, 90 to 97.5 wt. % of a polycarbonate-arylate ester); 2.5 to 10 wt. % of an aromatic organophosphorus compound such as BPADP or RDP; and optionally, up to 5 wt. % of an additive composition comprising an additive selected from a processing aid, a heat stabilizer, an ultra violet light absorber, a colorant, or a combination comprising at least one of the foregoing; wherein a sample of the thermoplastic composition has an OSU integrated 2 minute heat release test value of less than 65 kW-min/m$^2$ and a peak heat release rate of less than 65 kW/m$^2$, each measured using the method of FAR F25.4, in accordance with FAR 25.853 (d) at a thickness of 1.5 mm or 3 mm, an E662 smoke test DsMax value of less than 200 when measured at a thickness of 1.5 mm or 3 mm, a flame time of less than 15 seconds, a burn length of less than 6 inches, and a drip extinguishing time of less than 5 seconds, each measured using the method of FAR F25.5, in accordance FAR 25.853(a) at a thickness of 1.5 mm or 3 mm, a multiaxial impact energy of 100 J or higher and a ductility of 100%, measured at +23° C. at an impact speed 4.4 m/second in accordance with ISO 6603 on 3.2 mm thick discs, and optionally, a melt volume flow rate of greater than 5 cc/10 min measured at 300° C. under 1.2 kg force according to ISO 1133.

In any of the embodiments of the foregoing aircraft components, the light diffuser additive, if present, can comprise silicone, polymethylsilsesquioxane, crosslinked poly (methyl methacrylate), methyl methacrylate/ethyleneglycol dimethacrylate copolymer, TiO$_2$, or a combination comprising at least one of the foregoing, for example, 0.2 to 3.0, specifically 0.2 to 2.0, wt. % of the polymethylsilsesquioxanes light diffuser additives; or 0.4 to 1.5 wt. % of the crosslinked poly(methyl methacrylate) light diffuser additives, 0.4 to 1.5 wt. % of the polymethylsilsesquioxanes light diffuser additives, or a combination thereof, provided that the total amount of light diffuser additives is 3.0 wt. % or less can be used. The percent of a light diffuser additive is a weight percent based on the total weight of the polymers in the composition.

The high-clarity thermoplastic compositions can be used in the manufacture of aircraft component wherein the component is a window article comprising a sheet supported by a frame, wherein the sheet is molded or formed from the thermoplastic polymer composition. The sheet can have a first side and a second opposite side, and the window article can further comprises a first hard coat layer disposed on the first side and a second hard coat layer disposed on the second side. A first ultraviolet light-blocking layer can be disposed between the first hard coat layer and the first side of the sheet, and a second ultraviolet light-blocking layer can be disposed between the second hard coat layer and the second side of the sheet. For example, the component is a dust cover for a window, the window comprising an outer window and an inner window separated by a space; the dust cover separated from the inner window by a space, and a frame, wherein the outer window, inner window, and dust cover are secured in the frame such that the inner window is disposed between and is substantially coplanar with each of the dust cover and the outer window.

The high-clarity thermoplastic compositions can be used in the manufacture of aircraft component wherein the component is a mirror, comprising: a layer molded or formed from the thermoplastic polymer composition, a hard coat disposed on a surface of a first side of the layer, and an opacifying layer disposed on a surface of a second side of the layer opposite the first side. The opacifying layer can be a metal layer. A protective coat can be disposed on a surface of the opacifying layer opposite the layer molded or formed from the thermoplastic polymer composition.

Still further, at least a portion of a surface of the component is painted.

The disclosure is further illustrated by the following Examples. It should be understood that the non-limiting Examples are merely given for the purpose of illustration. Unless otherwise indicated, parts and percentages are by weight based upon the total weight of the thermoplastic composition.

EXAMPLES

The materials used in the Examples are described in Table 1.

TABLE 1

| Component | Description | Source |
|---|---|---|
| ITR-PC | ITR (Isophthalic acid-terephthalic acid-resorcinol) - bisphenol A copolyestercarbonate copolymer, ester content 83 mol %, interfacial | Sabic |

TABLE 1-continued

| Component | Description | Source |
|---|---|---|
| | polymerization, Mw about 21,000 g/mol, para-cumyl phenol end-capped | |
| ITR-PC-Si | Polysiloxane-ITR (Isophthalic acid-terephthalic acid-resorcinol) - bisphenol-A copolyestercarbonate copolymer, ester content 83 mol %, siloxane content 1 wt. % (average siloxane chain length about 10 containing eugenol end-caps), interfacial polymerization, Mw about 24,500 g/mol, para-cumyl phenol end-capped | Sabic |
| BPADP | CR-741; Bisphenol A diphosphate | Nagase (Europe) GmbH |
| PEPQ | Tetrakis(2,4-di-tert-butylphenyl)[1,1-biphenyl]-4,4'diylbisphosphonite | Clariant |
| TiO$_2$ | Coated titanium dioxide | DuPont |
| Carbon Black | Amorphous Carbon | Cabot |

Extrusion and Molding Conditions.

The compositions were made as follows. All solid additives (stabilizers, colorants, solid flame retardants) were dry blended off-line as concentrates using one of the primary polymer powders as a carrier and starve-fed via gravimetric feeder(s) into the feed throat of the extruder. The remaining polymer(s) were starve-fed via gravimetric feeder(s) into the feed throat of the extruder as well. The liquid flame retardants (e.g., BPADP, RDP) were fed before the vacuum using a liquid injection system. It will be recognized by one skilled in the art that the method is not limited to these temperatures or processing equipment.

Extrusion of all materials was performed on a 27 mm Werner-Pfleiderer ZAK twin-screw extruder (L/D ratio of 33/1) with a vacuum port located near the die face. The extruder has 9 zones, which were set at temperatures of 40° C. (feed zone), 200° C. (zone 1), 250° C. (zone 2), and 270° C. (zone 3) and 280-300° C. zone 4 to 8. Screw speed was 300 rpm and throughput was between 15 and 25 kg/hr.

The compositions were molded after drying at 100-110° C. for 6 hrs on a 45-ton Engel molding machine with 22 mm screw or 75-ton Engel molding machine with 30 mm screw operating at a temperature 270-300° C. with a mold temperature of 70-90° C. It will be recognized by one skilled in the art that the method is not limited to these temperatures or processing equipment.

FAR Testing Methods.

Heat release testing was performed on 15.2×15.2 cm plaques 1.5 mm thick using the Ohio State University (OSU) rate-of-heat release apparatus, in accordance with the method shown in FAR 25.853 (d), and in Appendix F, section IV (FAR F25.4). Total heat release was measured at the two-minute mark in kW-min/m$^2$ (kilowatt minutes per square meter). Peak heat release was measured as kW/m$^2$ (kilowatts per square meter). The heat release test method is also described in the "Aircraft Materials Fire Test Handbook" DOT/FAA/AR-00/12, Chapter 5 "Heat Release Test for Cabin Materials."

Smoke density testing (ASTM E-662-83, ASTM F-814-83, Airbus ABD0031, Boeing BSS 7239) was performed on 7.5×7.5 cm plaques of 1.5 mm thickness according to the method shown in FAR 25.853 (d), and in Appendix F, section V (FAR F25.5). Smoke density was measured under flaming mode. Smoke density (Ds) at 4.0 min, and the max level (DsMax) were reported.

Vertical Burn was performed according to FAR 25.853(a), Appendix F, Part I, (a),1, (i), on a plaque of 76×305 mm with a thickness of L5 or 3 mm using a vertical Bunsen burner. Test sample is placed beneath the burner for 60 seconds, after which the burner is removed and the flame time (time in seconds that the specimen continues to flame after burner flame is removed), the average drip extinguishing time (time in seconds that any flaming material continues to flame after falling from specimen) and the average burn length (distance from original specimen's edge to farthest evidence of damage to the specimen in mm) are measured.

Physical Property Testing Methods

The tests performed are summarized in Table 3.

TABLE 3

| Description | Test | Specimen | Property | Units |
|---|---|---|---|---|
| Melt volume flow rate at 300° C., 1.2 Kg | ISO 1133 | Pellets | MVR | cc/10 min |
| Multiaxial Impact, 23° C., 4.4 m/s | ISO 6603 | Disc, 3.2 mm thickness, 100 mm diameter | MAI | J |
| Vicat, B120 | ISO 306 | Multi-purpose ISO 3167 Type A, 4 mm thickness | Vicat | ° C. |
| Transmission | ASTM D1003 | plaque 75 × 75 × 3 mm | Transmission | % |
| Haze | ASTM D1003 | plaque 75 × 75 × 3 mm | Haze | — |

Examples 1-14

Examples 1-14 demonstrate the robust performance of compositions containing ITR-PC-Si and BPADP in FAR testing. Examples 1-7 in Table 2 show the FAR results at 3 mm thickness for compositions containing ITR-PC-Si and BPADP as well a composition without the BPADP, using a blend of ITR-PC-Si and ITR-PC. Examples 8-14 in Table 3 show the FAR results at 1.5 mm thickness for compositions containing ITR-PC-Si and BPADP as well a composition without the BPADP, using a blend of ITR-PC-Si and ITR-PC. All measurements were official tests performed by an officially certified test institute according to the respective standards.

TABLE 2

| Components | | Ex1 | Ex2 | Ex3 | Ex4 | Ex5 | Ex6 | CEx7 |
|---|---|---|---|---|---|---|---|---|
| ITR-PC-Si | % | 92.44 | 92.4 | 92.29 | 90.23 | 91.69 | 90.34 | 49.97 |
| ITR-PC | | | | | | | | 49.97 |
| BPADP | % | 7.50 | 7.50 | 7.50 | 7.50 | 7.50 | 7.50 | |
| PEPQ | % | 0.06 | 0.06 | 0.06 | 0.06 | 0.06 | 0.06 | 0.06 |
| TiO2 | % | | | | 2.20 | 0.55 | 2.00 | |
| Carbon Black | % | | | 0.15 | 0.00017 | 0.03725 | 0.10 | |
| Solvent Red 135 | % | | | | 0.000235 | | | |
| Copper Phthalocyanine Pigment Blue 15:4 | % | | | | 0.0001 | | | |
| Pigment Yellow 53 | % | | | | 0.01 | | | |
| Solvent Blue 104 | % | | | | | 0.125003 | | |
| Solvent Red 52 | % | | | | | 0.036503 | | |
| Solvent Yellow 93 | % | | | | | 0.00005 | | |
| Pigment Blue 60 | % | | 0.00035 | | | | | 0.00035 |
| Macrolex Violet 3R | % | | 0.00044 | | | | | 0.00044 |
| Color | — | Natural | Blue | Black | White | Blue opaque | Grey | Blue |
| OSU Test FAR 25.853 (d) Appendix F, Part IV, Requirement: OSU 2 min <65, OSU Max <65 | | | | | | | | |
| OSU 2 Min, Average | — | 24 | 26 | 14 | 9 | 21 | 25 | 12 |
| OSU 2 Min, STDEV | — | 8 | 3 | 2 | 6 | 7 | 4 | 3 |
| OSU 2 Peak, Average | — | 54 | 61 | 49 | 51 | 52 | 56 | 50 |
| OSU 2 Peak, STDEV | — | 4 | 4 | 8 | 9 | 7 | 6 | 14 |
| NBS Smoke density (ASTM F814/E662, Flaming Mode), Requirement: Ds Max <200 | | | | | | | | |
| DsMax, Average | — | 46 | 47 | 44 | 43 | 50 | 66 | 13 |
| DsMax, STDEV | — | 10 | 9 | 4 | 1 | 6 | 16 | 1 |
| 60 s Vertical Burn (FAR 25.853a, Appendix F, Part I, (a), 1, (i)), Requirement: Flame time <15 s, Burn Length <6 inch, Drip extinguishing time <5 s | | | | | | | | |
| Flame time, Average | S | 0 | 0 | 0 | 0 | 0 | 0 | 0 |
| Flame time, STDEV | S | 0 | 0 | 0 | 0 | 0 | 0 | 0 |
| Drip extinguishing time, Average | S | 0 | 0 | 0 | 0 | 0 | 0 | 0 |
| Drip extinguishing time, STDEV | S | 0 | 0 | 0 | 0 | 0 | 0 | 0 |
| Burn length, Average | Inch | 3.4 | 3.5 | 3.0 | 3.5 | 2.9 | 3.3 | 3.4 |
| Burn length, STDEV | Inch | 0.1 | 0.1 | 0 | 0 | 0.1 | 0.2 | 0.2 |
| FAR25.853 Pass/Fail | — | Pass | Pass | Pass | Pass | Pass | Pass | Pass |

TABLE 3

| Components | | Ex9 | Ex9 | Ex10 | Ex11 | Ex12 | Ex13 | CEx14 |
|---|---|---|---|---|---|---|---|---|
| ITR-PC-Si | % | 92.44 | 92.44 | 92.29 | 90.23 | 91.69 | 90.34 | 49.97 |
| ITR-PC | | | | | | | | 49.97 |
| BPADP | % | 7.50 | 7.50 | 7.50 | 7.50 | 7.50 | 7.50 | |
| PEPQ | % | 0.06 | 0.06 | 0.06 | 0.06 | 0.06 | 0.06 | 0.06 |
| TiO2 | % | | | | 2.20 | 0.55 | 2.00 | |
| Carbon Black | % | | | 0.15 | 0.00017 | 0.03725 | 0.10 | |
| Solvent Red 135 | % | | | | 0.000235 | | | |
| Copper Phthalocyanine Pigment Blue 15:4 | % | | | | 0.0001 | | | |
| Pigment Yellow 53 | % | | | | 0.01 | | | |
| Solvent Blue 104 | % | | | | | 0.125003 | | |
| Solvent Red 52 | % | | | | | 0.036503 | | |
| Solvent Yellow 93 | % | | | | | 0.00005 | | |
| Pigment Blue 60 | % | | 0.00035 | | | | | 0.00035 |
| Macrolex Violet 3R | % | | 0.00044 | | | | | 0.00044 |
| Color | — | Natural | Blue | Black | White | Blue opaque | Grey | Blue |
| OSU Test FAR 25.853 (d) Appendix F, Part IV, Requirement: OSU 2 min <65, OSU Max <65 | | | | | | | | |
| OSU 2 Min, Average | — | 36 | 36 | 33 | 34 | 39 | 32 | 42 |
| OSU 2 Min, STDEV | — | 5 | 6 | 4 | 4 | 4 | 4 | 2 |
| OSU 2 Peak, Average | — | 38 | 46 | 35 | 45 | 49 | 52 | 39 |
| OSU 2 Peak, STDEV | — | 3 | 13 | 3 | 3 | 7 | 5 | 3 |
| NBS Smoke density (ASTM F814/E662, Flaming Mode), Requirement: Ds Max <200 | | | | | | | | |
| DsMax, Average | — | 51 | 36 | 51 | 51 | 54 | 51 | 9 |
| DsMax, STDEV | — | 9 | 13 | 3 | 8 | 13 | 4 | 1 |
| 60 s Vertical Burn (FAR 25.853a, Appendix F, Part I, (a), 1, (i)), Requirement: Flame time <15 s, Burn Length <6 inch, Drip extinguishing time <5 s | | | | | | | | |
| Flame time, Average | S | 2.7 | 0 | 0 | 1.0 | 0.3 | 0.7 | 12 |
| Flame time, STDEV | S | 0.6 | 0 | 0 | 1.0 | 0.6 | 0.1 | 20 |
| Drip extinguishing time, Average | S | 2.3 | 0 | 0 | 0 | 0.3 | 0 | 1.3 |
| Drip extinguishing time, STDEV | S | 0.6 | 0 | 0 | 0 | 0.6 | 0 | 1.5 |
| Burn length, Average | inch | 3.0 | 4.4 | 3.8 | 4.2 | 3.6 | 4.4 | 4.5 |
| Burn length, STDEV | inch | 0 | 0.1 | 0.3 | 0.3 | 0.7 | 0.1 | 0.5 |
| FAR25.853 Pass/Fail | — | Pass | Pass | Pass | Pass | Pass | Pass | Pass |

Examples 1 to 6 and 8 to 13 show that at various colors, ranging from no colorants (Example 1 and 8), blue tinted natural (Example 2 and 9), solely carbon black (Example 3 and 10) and opaque colors with relatively high TiO$_2$ loadings (Examples 4-6 and 11-13), all FAR 25.853 requirements are met at both 1.5 and 3 mm thickness for compositions containing ITR-PC-Si and 7.5 wt. % BPADP, including OSU heat release, smoke density and 60 s vertical burn. In all cases, averages are far below the upper limit set forth by FAR 25.853 and standard deviations are relatively low.

In comparison, one composition containing no BPADP is shown. According to Comparative Example 7, at 3 mm thickness, the composition also meets all requirements with low average values and low standard deviations. However, despite the fact that FAR is also met at 1.5 mm thickness (Comparative Example 14), the performance in the vertical burn test is at the borderline. Flame time average is relatively close to the upper specification and the high standard deviation of 20 suggests that this composition will not always have a low enough flame time to robustly meet FAR 35.853 requirements. Accordingly, parts made from compositions like the one in Comparative Examples 7 and 14 would need a hardcoat in order to obtain robust performance in FAR 25.853, whereas the compositions of Examples 1-6 and 8-13 do not need this hardcoat to robustly pass FAR 25.853.

As can be observed, at both thicknesses, the smoke density of the Comparative Examples 7 and 14 is better than that for the Examples 1 to 6 and 8 to 13. Nevertheless, average values of smoke density for the examples are still low enough for compositions containing ITR-PC-Si and 7.5% BPADP to allow the composition to meet FAR 25.853 requirements.

The Examples demonstrate the ability of an aromatic organophosphorus compound such as BPADP, present at the amounts shown, in ITR-PC-Si to achieve a unique balance of properties meeting all FAR 25.853 requirements, including smoke density, OSU heat release and 60 s vertical burn, as measured according to the respective standards, which could not be achieved for compositions without the addition of an aromatic organophosphorus compound such as BPADP, and as such are highly suitable for aircraft interior applications.

Examples 15-21

Composition containing ITR-PC-Si with different BPADP contents and different ITR-PC/ITR-PC-Si loadings with 7.5% BPADP, all in natural color, have been screened for FAR at 3 mm thickness. The tests were not performed by officially certified test institutes and tests were indicative only, but performed according to the respective standards. The results are shown in Table 4.

TABLE 4

| Components | Units | CEx15 | Ex16 | Ex17 | Ex18 | Ex19 | CEx20 | Ex21 | Ex22 |
|---|---|---|---|---|---|---|---|---|---|
| ITR-PC-Si | % | 99.94 | 97.44 | 94.94 | 92.44 | 89.94 | 84.94 | 46.22 | |
| ITR-PC | % | | | | | | | 46.22 | 92.44 |
| BPADP | % | | 2.5 | 5 | 7.5 | 10 | 15 | 7.5 | 7.5 |
| PEPQ | % | 0.06 | 0.06 | 0.06 | 0.06 | 0.06 | 0.06 | 0.06 | 0.06 |
| OSU Test FAR 25.853 (d) Appendix F, Part IV, Requirement: OSU 2 min <65, OSU Max <65 | | | | | | | | | |
| OSU 2 Min, Average | — | | 4 | 1 | 1 | 12 | 4 | 8 | 2 | 1 |
| OSU 2 Peak, Average | — | | 36 | 29 | 23 | 35 | 32 | 41 | 40 | 50 |
| NBS Smoke density (ASTM F814/E662, Flaming Mode), Requirement: Ds Max <200 | | | | | | | | | |
| DsMax, Average | — | | 18 | 43 | 83 | 40 | 146 | 205 | 108 | 90 |
| DsMax, STDEV | — | | 1 | 3 | 13 | 1 | 24 | 4 | 30 | 40 |
| 60 s Vertical Burn (FAR 25.853a, Appendix F, Part I, (a), 1, (i)), Requirement: Flame time <15 s, Burn Length <150 mm, Drip extinguishing time <5 s | | | | | | | | | |
| Flame time, Average | S | 3.3 | 2.0 | 0.7 | 0 | 0 | 0 | 0 | 0 |
| Flame time, STDEV | S | 3.1 | 1.7 | 0.6 | 0 | 0 | 0 | 0 | 0 |
| Drip extinguishing time, Average | S | 1.0 | 1.0 | 0.3 | 0 | 0 | 0 | 0 | 0 |
| Drip extinguishing time, STDEV | S | 1.7 | 0 | 0.6 | 0 | 0 | 0 | 0 | 0 |
| Burn length, Average | inch | 4.1 | 3.7 | 4.0 | 3.0 | 3.9 | 4.0 | 3.7 | 3.9 |
| Burn length, STDEV | inch | 0.4 | 0.3 | 0.5 | 0 | 0.2 | 0.3 | 0.2 | 0.1 |
| FAR25.853 Pass/Fail | — | Pass | Pass | Pass | Pass | Pass | Pass | Pass | Pass |
| Physical properties | | | | | | | | | |
| MVR, 300° C., 1.2 kg | cc/10 min | 4.5 | 5.88 | 7.4 | 9.3 | 11.6 | 19.5 | 13.7 | 20.5 |
| Multiaxial impact energy RT | J | 153 | 143 | 152 | 143 | 155 | 145 | 146 | 139 |
| Multiaxial impact ductility RT | % | 100 | 100 | 100 | 100 | 100 | 100 | 100 | 100 |
| Multiaxial impact energy, 0° C. | J | 115 | 144 | 163 | 137 | 155 | N.A. | 144 | 145 |
| Multiaxial impact ductility. 0° C. | % | 100 | 100 | 100 | 100 | 100 | N.A. | 100 | 100 |
| Vicat B120 | ° C. | 138 | 130 | 123 | 115 | 110 | 99 | 117 | 115 |
| Transmission | % | 85.0 | 86.0 | 86.3 | 87.7 | 86.1 | 86.9 | 86.9 | 88.0 |
| Haze | — | | 3.1 | 2.6 | 2.6 | 1.7 | 2.2 | 2.0 | 2.4 | 2.3 |

The examples show that for compositions containing ITR-PC-Si and BPADP, at BPADP contents of 10% and lower, smoke density values are still good enough to meet the requirements set forth by the FAR standard. Above 10% (CEx20), smoke density values become too high and do not meet the requirement of less than 200. Therefore, BPADP contents should not exceed 10% to allow meeting FAR 25.853 requirements for smoke density and typically lower BPADP contents are desired to achieve lower smoke density values.

In all cases, OSU 65/65 requirements are easily met and values are as well below OSU 55/55 requirements. BPADP content does not have a significant effect on the OSU test results. Regarding vertical burn, all compositions pass the requirements, but the composition without BPADP has relatively high standard deviations (CEx15), especially for the drip extinguishing time, which again suggests that BPADP addition is necessary to achieve robust vertical burn performance. The data indicates that 2.5% of BPADP is sufficient to achieve the required performance for vertical burn.

Figure 8:
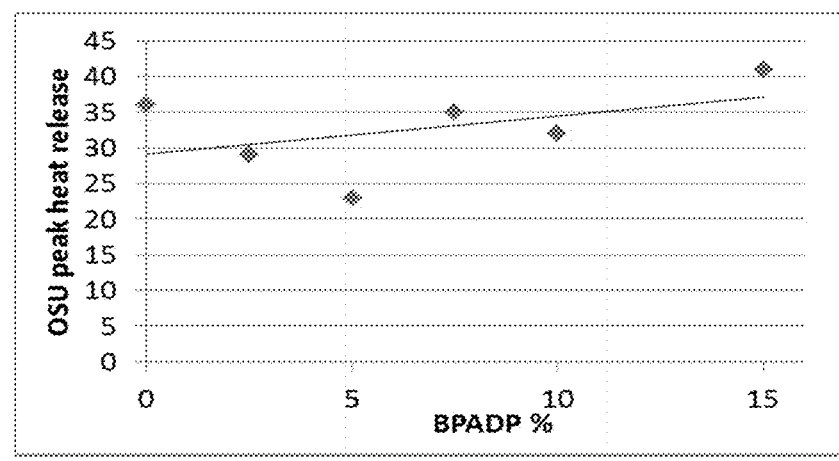
FIG. 8 shows the effect of increasing BPADP concentration in an ITR-PC-Si copolymer on OSU heat release.
Figure 9:
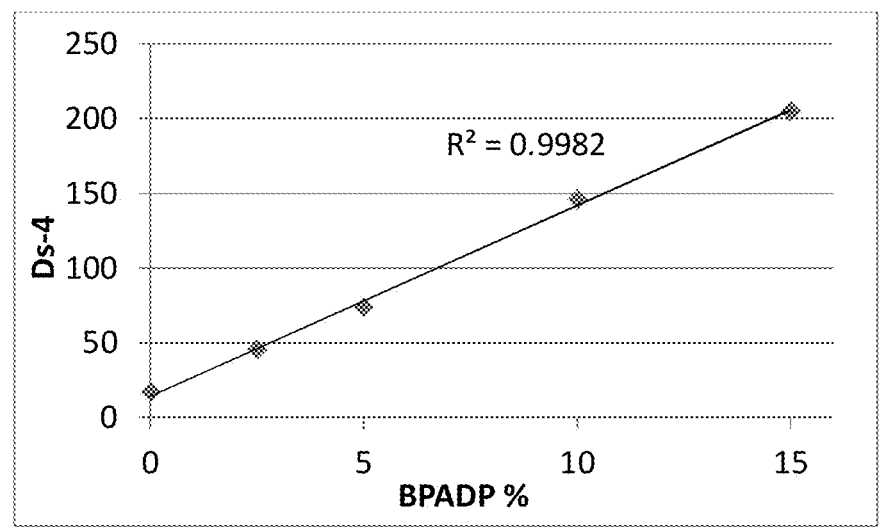
FIG. 9 shows the effect of increasing BPADP concentration in an ITR-PC-Si copolymer on Ds-4 smoke density.

FIGS. 8 and 9 show that BPADP mainly has a negative influence on the smoke density and no significant effect on OSU peak heat release.

Replacing ITR-PC-Si in compositions containing 7.5% BPADP (Example 18) partially (Example 21) or fully (Example 22) with ITR-PC does not significantly affect the vertical burn properties or smoke density and slightly increases OSU heat release values, but still easily within the 65/65 requirements. Therefore, compositions containing BPADP and ITR-PC, ITR-PC-Si or a combination of the two can be used to meet all FAR 25.853 requirements.

BPADP addition also improves the melt flow of the compositions, with MVR values higher than the composition without BPADP (MVR of 4.5 cc/10 min, CEx15) ranging from 5.8 (Ex16, 2.5% BPADP) to 11.6 cc/10 min (Ex19, 10% BPADP) depending on the BPADP content. Replacing ITR-PC-Si in compositions containing 7.5% BPADP (Example 18) partially (Example 21) or fully (Example 22) with ITR-PC further increases the MVR from 9.3 (Example 18) to 13.7 (Example 21) and 20.5 cc/10 min (Example 22). In all cases, this improvement in flow is achieved without significantly compromising practical impact, as indicated by the high multiaxial impact energy above 100 J and ductility of 100% at room temperature for all examples 15 to 21. Also at lower temperatures of 0° C., high impact energy above 100 J and ductility is retained.

Furthermore, these compositions can be formulated to have high transparency values (above 85%) and low haze (below 3) measured according to ASTM D1003 using the color space CIE1931 (Illuminant C and a 2° observer) at 3 mm thickness. As such, these compositions are also suitable for aircraft components requiring high transparency and/or low haze.

The Examples demonstrate the ability of an aromatic organophosphorus compound such as BPADP, present at the amounts shown, in ITR-PC, ITR-PC-Si or their combination to achieve a unique balance of meeting all FAR 25.853 requirements, including smoke density, OSU heat release and 60 s vertical burn, as measured according to the respective standards, in combination with high flow rate (MVR) and high practical multiaxial impact (MAI), which could not be achieved for compositions without the addition of an aromatic organophosphorus compound such as BPADP or compositions with too high BPADP loadings, and as such are highly suitable for aircraft interior applications. Furthermore, the excellent transparency and haze makes these compositions excellent candidates for transparent or diffusive aircraft interior applications.

Examples 22-24

Examples 2-24 compare the overall performance of the composition of this disclosure with existing materials. The results are shown in Table 5.

TABLE 5

| Components | | Ex22 | CEx23 | CEx24 |
|---|---|---|---|---|
| ITR-PC-Si | % | 92.44 | 87.94 | 49.97 |
| ITR-PC | % | | | 49.97 |
| PC105B | % | | 12.00 | |
| BPADP | % | 7.50 | | |
| PEPQ | % | 0.06 | 0.06 | 0.06 |
| Properties | | | | |
| Tensile modulus | MPa | 2600 | 2500 | 2500 |
| Tensile strength | MPa | 77 | 74 | 75 |
| Yield Stress | MPa | 70 | 76 | 75 |
| Stress at Yield | % | 6 | 7 | 7 |
| Stress at Break | % | 80 | 100 | 100 |
| Flexural Modulus | MPa | 2700 | 2320 | 2330 |
| Flexural strength | MPa | 110 | 107 | 104 |
| HDT 1.8 | °C. | 95 | 117 | 116 |
| MAI RT Ductility | J | 100 | 100 | 100 |
| MAI 0° C. Ductility | J | 100 | 100 | 100 |
| MAI −30° C. Ductility | J | 100 | 100 | 100 |
| INI RT energy | kJ/m$^2$ | 12 | 16 | 28 |
| INI −30° C. energy | kJ/m$^2$ | 10 | 10 | 18 |
| MVR, 300° C., 1.2 kg | Cc/10 min | 10 | 4 | 7 |
| Density | g/cm$^3$ | 1.33 | 1.34 | 1.31 |
| 60 s Vertical Burn, robustly pass/fail | — | Pass | Pass | Fail |
| OSU Heat release, robustly pass/fail | — | Pass | Pass | Pass |
| Smoke density, robustly pass/fail | — | Pass | Pass | Pass |
| Hardcoat needed to robustly pass FAR | — | No | No | Yes |
| Transparency, 3 mm | % | >85 | <50 | >85 |
| Haze, 3 mm | — | <3 | >80 | <3 |
| Halogen containing | — | No | Yes | No |

Example 22 demonstrates that the composition of the disclosure can meet all FAR 25.853 requirements at 1.5 and 3 mm without hardcoat; has higher melt flow (MVR of 10) than Comparative Example 23 (CEx23) and Comparative Example 24 (CEx24), allowing molding complex and large parts; has similar density as CEx23 and CEx24; has similar transparency and haze levels compared to CEx24; has similar mechanical properties, including tensile and flexural strength as CEx23 and CEx24; has improved tensile and flexural modulus compared to CEx23 and CEx24; has similar practical impact as CEx23 and CEx24, although notched Izod is somewhat less; has lower HDT (about 20° C.), which will allow easier forming of extruded parts, similarly to polycarbonate/acrylonitrile butadiene styrene resins; and is fully halogen free.

Comparative Example 23 has low melt flow and higher HDT. In addition, Comparative 23 is an opaque material (low transmission and high haze) and is halogen rich.

Comparative Example 24 does not perform well in 60 s vertical burn test, thereby requiring secondary operation (hard coat). In addition, the composition of Comparative 24 has lower melt flow and higher HDT.

In conclusion, blends of BPADP and ITR-PC-Si and/or ITR-PC offer a balance of properties, which cannot be met by any other known thermoplastic, and therefore the interior aircraft parts molded, formed or extruded from these compositions can offer the following balance of properties: robustly meeting all FAR25.853 requirements, including smoke density, smoke toxicity, OSU heat release and 60 s vertical burn; high melt flow, allowing injection molding large and complex parts; good sheet extrudability, with good surface finish and no visual defects; relatively high stiffness for un-filled resins; relatively low heat properties, allowing easy forming of parts; good practical impact; high transmission and low haze, allowing the manufacture of transparent parts without applying a hardcoat; relatively low density and fully halogen-free.

The singular forms "a," "an," and "the" include plural referents unless the context clearly dictates otherwise. "Or" means "and/or." The endpoints of all ranges directed to the same component or property are inclusive and independently combinable. The suffix "(s)" as used herein is intended to include both the singular and the plural of the term that it modifies, thereby including at least one of that term (e.g., "colorant(s)" includes at least one colorant). "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs.

As used herein, a "combination" is inclusive of blends, mixtures, alloys, reaction products, and the like. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refer broadly to a substituent comprising carbon and hydrogen, optionally with 1 to 3 heteroatoms, for example, oxygen, nitrogen, halogen, silicon, sulfur, or a combination comprising at least one of the foregoing; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy groups; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

While the invention has been described with reference to embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:
1. An aircraft component,
   wherein the aircraft component is a molded, formed or extruded component, comprising a thermoplastic composition comprising, based on the total weight of the composition:
   2.5 to 10 wt. % of an organophosphorus compound; and
   90 to 97.5 wt. % of a first polymer, or a second polymer, or a combination comprising at least one of the foregoing polymers; and
   optionally, up to 5 wt. % of an additive composition comprising an additive selected from a processing aid, a heat stabilizer, an ultra violet light absorber, a colorant, or a combination comprising at least one of the foregoing;
   wherein
   the first polymer comprises:
   2 to 20 mol % of bisphenol-A carbonate units of the formula

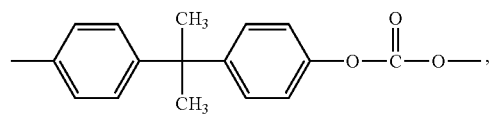

greater than 60 to 98 mol % of isophthalic acid-terephthalic acid-resorcinol ester units of the formula

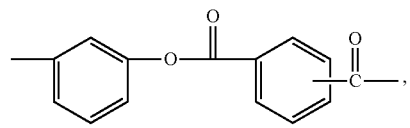

and optionally, 1 to 20 mol % resorcinol carbonate units of the formula

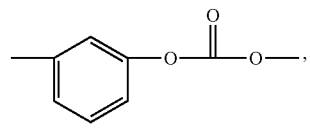

isophthalic acid-terephthalic acid-bisphenol-A ester units of the formula

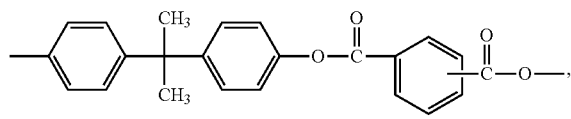

or a combination comprising at least one of the foregoing;

the second polymer comprises
1 to 20 mol % of bisphenol A carbonate units of the formula

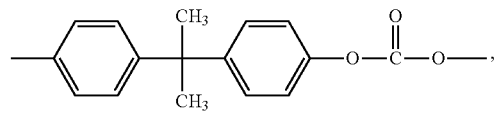

greater than 60 to 90 mol % of isophthalic acid-terephthalic acid-resorcinol units of the formula

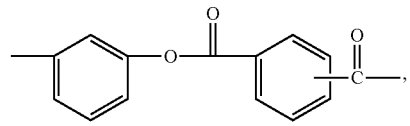

and siloxane units in an amount effective to provide 0.1 to 10 wt. % of siloxane units, based on the weight of the second polymer, wherein the siloxane units are of the formula

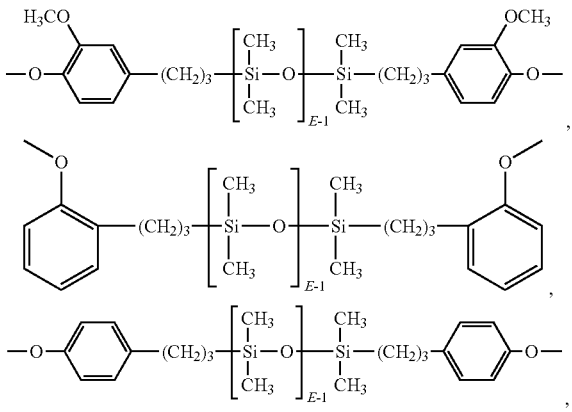

or a combination comprising at least one of the foregoing,
wherein E has an average value of 2 to 90,
wherein the aromatic organophosphorus compound is of the formula

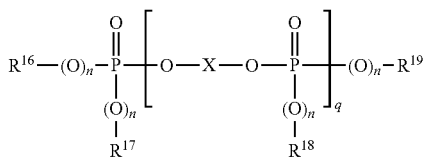

wherein
each of $R^{16}$, $R^{17}$, $R^{18}$ and $R^{19}$ is phenyl, and
X is of the formula

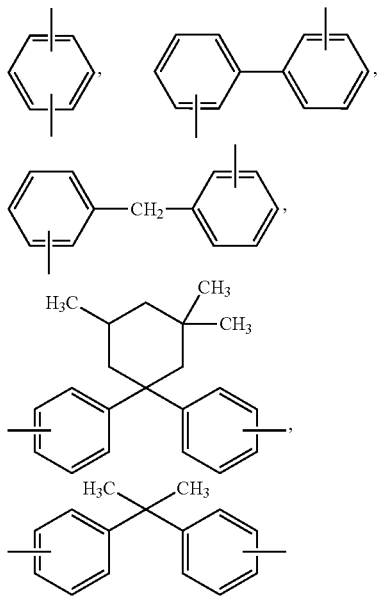

each n is 1, and
q is from 1 to 5;
wherein a sample of the thermoplastic composition has an OSU integrated 2 minute heat release test value of less than 65 kW-min/m² and a peak heat release rate of less than 65 kW/m², each measured using the method of FAR F25.4, in accordance with FAR 25.853 (d) at a thickness of 1.5 mm or 3 mm,
an E662 smoke test DsMax value of less than 200 when measured at a thickness of 1.5 mm or 3 mm,
a flame time of less than 15 seconds, a burn length of less than 6 inches, and a drip extinguishing time of less than 5 seconds, each measured using the method of FAR F25.5, in accordance with FAR 25.853(a) at a thickness of 1.5 mm or 3 mm, and
an energy in multiaxial impact of 100 J or more and a ductility in multiaxial impact of 100%, measured at +23° C. at an impact speed of 4.4 m/second in accordance with ISO 6603 on 3.2 mm thick discs.

2. The aircraft component of claim 1, wherein the component has a transmission of 85% or more or a haze of 3% or less, measured according to ASTM D1003 using the color space CIE1931 (Illuminant C and a 2° observer) at a thickness of 3 mm.

3. The aircraft component of claim 1, wherein the thermoplastic composition has a melt volume rate of greater than 5 cc/10 min and less than 25 cc/10 min measured at 300° C. under 1.2 kg force measured according to ISO 1133.

4. The aircraft component of claim 1, wherein E has an average value of 2 to 50.

5. The aircraft component of claim 1, wherein the organophosphorus compound is bisphenol A bis(diphenyl phosphate), resorcinol bis(diphenyl phosphate), a phenol/bi-phenol polyphosphate, or a combination comprising at least one of the foregoing.

6. The aircraft component of claim 1, wherein the organophosphorus compound is effective to provide phosphorus in an amount of 0.1% to 1.0% of phosphorus, based on the weight of the thermoplastic composition.

7. The aircraft component of claim 1, wherein the thermoplastic composition comprises, based on the total weight of the composition,
2.5 to 10 wt. % of bisphenol A bis(diphenyl phosphate);
90 to 97.5 wt. % of a combination comprising, based on the weight of the combination,
  20 to 80 wt. % of the first polymer,
and
  20 to 80 wt. % of a poly(bisphenol-A carbonate)-co-poly(isophthalate-terephthalate-resorcinol ester)-co-poly(siloxane) comprising,
    1 to 20 mol % of bisphenol A carbonate units,
    60 to 90 mol % of isophthalic acid-terephthalic acid-resorcinol units, and
    siloxane units of the formula

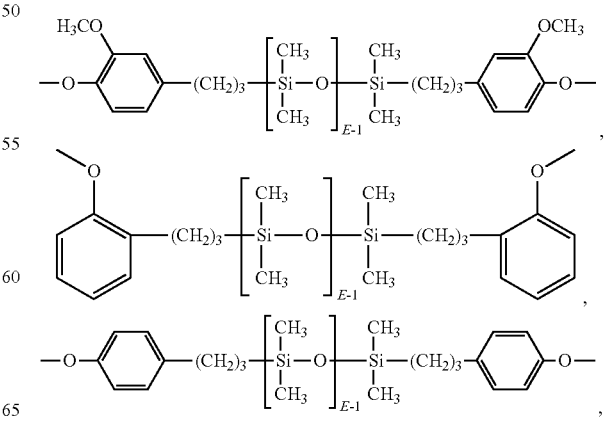

or a combination comprising at least one of the foregoing, wherein E has an average value of 2 to 50, wherein the siloxane units are present in an amount effective to provide 0.1 to 10 wt. % of siloxane units, based on the weight of the poly(bisphenol-A carbonate)-co-poly(isophthalate-terephthalate-resorcinol ester)-co-poly(siloxane); and optionally, up to 5 wt. % of an additive composition comprising an additive selected from a processing aid, a heat stabilizer, an ultra violet light absorber, a colorant, or a combination comprising at least one of the foregoing.

8. The aircraft component of claim 1, wherein the thermoplastic composition comprises based on the total weight of the composition,
2.5 to 10 wt. % of bisphenol A bis(diphenyl phosphate);
90 to 97.5 wt. % of the first polymer,
optionally, up to 5 wt. % of an additive composition comprising an additive selected from a processing aid, a heat stabilizer, an ultra violet light absorber, a colorant, or a combination comprising at least one of the foregoing.

9. The aircraft component of claim 1, wherein the thermoplastic composition comprises, based on the total weight of the composition,
2.5 to 10 wt. % of bisphenol A bis(diphenyl phosphate);
90 to 97.5 wt. % of a poly(bisphenol-A carbonate)-co-poly(isophthalate-terephthalate-resorcinol ester)-co-poly(siloxane) which comprises
1 to 20 mol % of bisphenol A carbonate units,
60 to 90 mol % of isophthalic acid-terephthalic acid-resorcinol units, and siloxane units of the formula

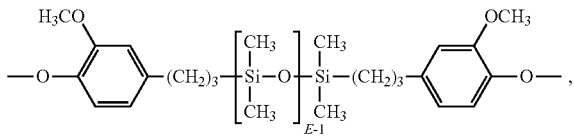

or a combination comprising at least one of the foregoing, wherein E has an average value of 5 to 50, and the siloxane units are present in an amount effective to provide 0.1 to 10 wt. % of siloxane units, based on the weight of the poly(bisphenol-A carbonate)-co-poly(isophthalate-terephthalate-resorcinol ester)-co-poly(siloxane); and optionally, up to 5 wt. % of an additive composition comprising an additive selected from a processing aid, a heat stabilizer, an ultra violet light absorber, a colorant, or a combination comprising at least one of the foregoing.

10. The aircraft component of claim 1, wherein the thermoplastic composition further comprises 0.05 to 10.0 wt. % of a light diffuser additive comprising silicone, polymethylsilsesquioxane, crosslinked poly(methyl methacrylate), methyl methacrylate/ethyleneglycol dimethacrylate copolymer, $TiO_2$, or a combination comprising at least one of the foregoing, based on the total weight of the polymers in the thermoplastic composition, and wherein a molded or formed sample of the thermoplastic polymer composition has a transmission of 20% to 90% or a haze of 70% to 99.9%, each measured according to ASTM D1003 using the color space CIE1931 (Illuminant C and a 2° observer) at a thickness of 3 mm.

11. The aircraft component of claim 1, wherein the thermoplastic composition further comprises 0.2 to 2.0 wt. % of a polymethylsilsesquioxane light diffuser additive, based on the total weight of the polymers in the thermoplastic composition.

12. The aircraft component of claim 1, wherein the thermoplastic composition further comprises, based on the total weight of the polymers in the thermoplastic composition, 0.4 to 1.5 wt. % of the crosslinked poly(methyl methacrylate) light diffuser additive, 0.4 to 1.5 wt. % of a polymethylsilsesquioxane light diffuser additive, or a combination thereof, provided that the total amount of light diffuser additive is 3 wt. % or less.

13. The aircraft component of claim 1, wherein the thermoplastic composition further comprises 0.00002 to 5.0 wt. % of one or more colorants based on the total weight of the polymers in the thermoplastic composition.

14. The aircraft component of claim 1, wherein the thermoplastic composition further comprises 0.025 to 5 wt. % $TiO_2$, based on the total weight of the polymers in the composition.

15. The aircraft component of claim 1, wherein the thermoplastic composition further comprises 0.0001 to 0.1 wt. % of carbon black, based on the total weight of the polymers in the composition.

16. The aircraft component of claim 1, wherein the thermoplastic composition further comprises a UV absorber selected from 2,2'-(1,4-phenylene)bis-2,2'-(1,4-phenylene) bis(4H-3,1-benzoxazin-4-one); 2-(2'hydroxy-5-t-octylphenyl)-benzotriazole; 2-(2H-benzotriazol-2-yl)4,6-bis(1-ethyl-1-phenylethylphenol; or a combination comprising at least one of the forgoing.

17. The aircraft component of claim 1, wherein no or substantially no halogen-containing compounds are present in the thermoplastic composition.

18. The aircraft component of claim 1, wherein the component is selected from access panels, access doors, air flow regulators, air gaspers, air grilles, arm rests, baggage storage doors, balcony components, cabinet walls, ceiling panels, door pulls, door handles, duct housings, enclosures for electronic devices, equipment housings, equipment panels, floor panels, food carts, food trays, galley surfaces, grilles, handles, housings for TVs and displays, light panels, magazine racks, telephone housings, partitions, parts for trolley carts, seat backs, seat components, railing components, seat housings, shelves, side walls, speaker housings, storage compartments, storage housings, toilet seats, tray tables, trays, trim panel, window moldings, window slides, and windows.

19. The aircraft component of claim 1, wherein the component is selected from access panels, access doors, access door panels, access door panel call buttons, light covers, light bezels, air flow regulators, baggage storage doors, display panels, display units, door handles, door pulls, enclosures for electronic devices, food carts, food trays, trolley carts, trolley side walls, grilles, handles, stow bin components, magazine racks, seat components, partitions, mirrors, refrigerator doors, seat backs, arm rests, foot rests, side walls, tray tables, trim panels, windows, window dust covers.

20. The aircraft component of claim 1, wherein the component is a window article comprising a sheet supported by a frame, wherein the sheet is molded, formed or extruded from the thermoplastic polymer composition.

21. The aircraft component of claim 20, wherein the sheet has a first side and a second opposite side, and the window article further comprises a first hard coat layer disposed on the first side and a second hard coat layer disposed on the second side.

22. The aircraft component of claim 21, further comprising
a first ultraviolet light-blocking layer disposed between the first hard coat layer and the first side of the sheet, and
a second ultraviolet light-blocking layer disposed between the second hard coat layer and the second side of the sheet.

23. The aircraft component of claim 1, wherein the component is a dust cover for a window, the window comprising:
an outer window and an inner window separated by a space;
the dust cover separated from the inner window by a space, and
a frame,
wherein the outer window, inner window, and dust cover are secured in the frame such that the inner window is disposed between and is substantially coplanar with each of the dust cover and the outer window.

24. The aircraft component of claim 1, wherein the component is a mirror, comprising:
a layer molded, formed or extruded from the thermoplastic polymer composition,
a hard coat disposed on a surface of a first side of the layer, and
an opacifying layer disposed on a surface of a second side of the layer opposite the first side.

25. The aircraft of claim 24, wherein the opacifying layer is a metal layer.

26. The aircraft of claim 24, further comprising a protective coat disposed on a surface of the opacifying layer opposite the layer molded, formed, or extruded from the thermoplastic polymer composition.

27. The aircraft component of claim 1, wherein at least a portion of a surface of the component is painted.

28. An aircraft component wherein the component is a partition or a light cover, and wherein the aircraft component is molded or formed from a thermoplastic polymer composition comprising, based on the total weight of the composition,
2.5 to 10 wt. % of an organophosphorus compound;
90 to 97.5 wt. % of a first polymer, or a second polymer, or a combination comprising at least one of the foregoing polymers;
optionally, up to 5 wt. % of an additive composition comprising an additive selected from a processing aid, a heat stabilizer, an ultra violet light absorber, a colorant, or a combination comprising at least one of the foregoing; and
0.05 to 10 wt. % of a light diffuser additive, based on the total weight of the polymers in the thermoplastic composition;
wherein
the first polymer comprises:
2 to 20 mol % of bisphenol-A carbonate units of the formula

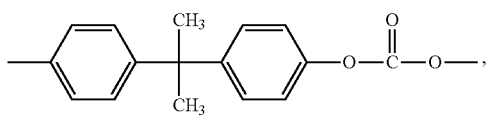

greater than 60 to 98 mol % of isophthalic acid-terephthalic acid-resorcinol ester units of the formula

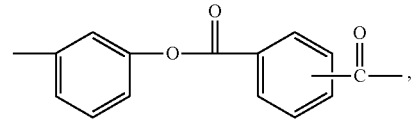

and
optionally, 1 to 20 mol % resorcinol carbonate units of the formula

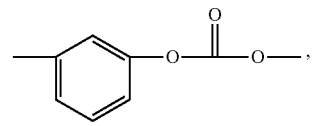

isophthalic acid-terephthalic acid-bisphenol-A ester units of the formula

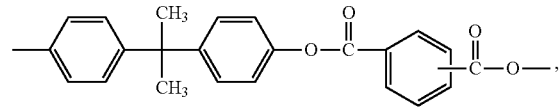

or a combination comprising at least one of the foregoing;
the second polymer comprises
1 to 20 mol % of bisphenol A carbonate units of the formula

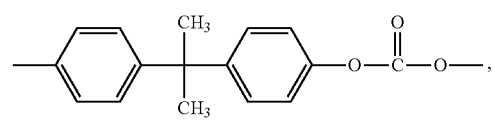

greater than 60 to 90 mol % of isophthalic acid-terephthalic acid-resorcinol units of the formula

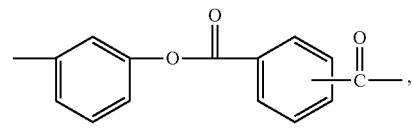

and
siloxane units in an amount effective to provide 0.1 to 10 wt. % of siloxane units, based on the weight of the second polymer,
wherein the siloxane units are of the formula

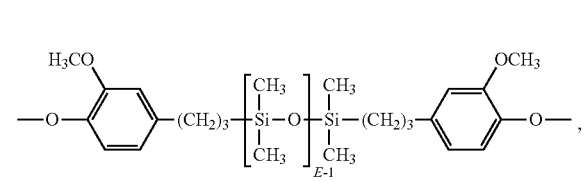

-continued

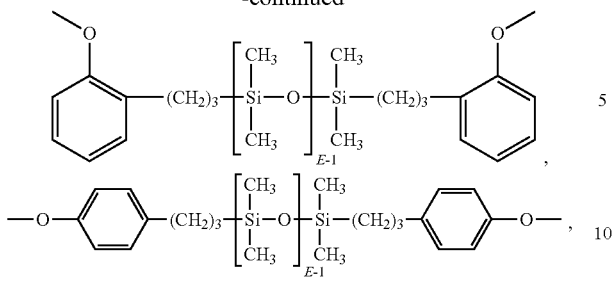

or a combination comprising at least one of the foregoing, wherein E has an average value of 2 to 90;
wherein the aromatic organophosphorus compound is of the formula

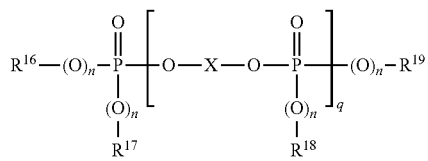

wherein
each of $R^{16}$, $R^{17}$, $R^{18}$ and $R^{19}$ is phenyl, and X is of the formula

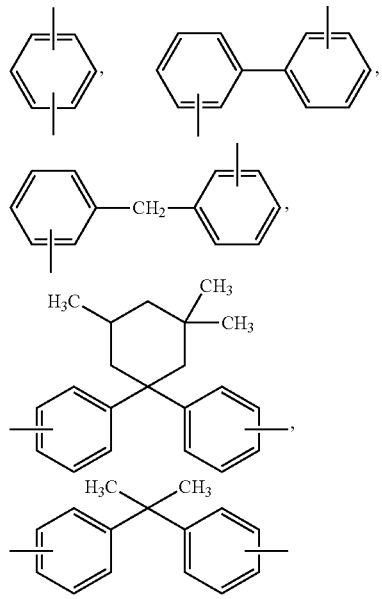

each n is 1, and
q is from 1 to 5;
wherein a molded or formed sample of the thermoplastic polymer composition has
a transmission of 20% to 90% or a haze of 70% to 99.9%, each measured according to ASTM D1003 using the color space CIE1931 (Illuminant C and a 2° observer) at a thickness of 3 mm,
an OSU integrated 2 minute heat release test value of less than 65 kW-min/m² and a peak heat release rate of less than 65 kW/m², each measured using the method of FAR F25.4, in accordance with FAR 25.853 (d) at a thickness of 1.5 mm or 3 mm,
an E662 smoke test DsMax value of less than 200 when measured at a thickness of 1.5 mm or 3 mm,
a flame time of less than 15 seconds, a burn length of less than 6 inches, and a drip extinguishing time of less than 5 seconds, each measured using the method of FAR F25.5, in accordance with FAR 25.853(a) at a thickness of 1.5 mm or 3 mm,
an energy in multiaxial impact of 100 J or more and a ductility in multiaxial impact of 100%, measured at +23° C. at an impact speed of 4.4 m/second in accordance with ISO 6603 on 3.2 mm thick discs, and
optionally, a melt volume flow rate of greater than 5 cc/10 min measured at 300° C. under 1.2 kg force according to ISO 1133.

29. An aircraft component wherein the component is a trolley sidewall, an access door, or an access panel, and wherein the aircraft component is molded or formed from a thermoplastic polymer composition comprising, based on the total weight of the composition, 2.5 to 10 wt. % of an organophosphorus compound;

90 to 97.5 wt. % of a first polymer, or a second polymer, or a combination comprising at least one of the foregoing polymers; and optionally, up to 5 wt. % of an additive composition comprising an additive selected from a processing aid, a heat stabilizer, an ultra violet light absorber, a colorant, or a combination comprising at least one of the foregoing;

wherein the first polymer comprises:

2 to 20 mol % of bisphenol-A carbonate units of the formula

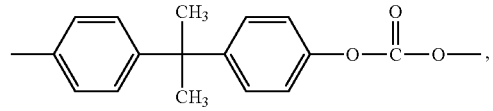

greater than 60 to 98 mol % of isophthalic acid-terephthalic acid-resorcinol ester units of the formula

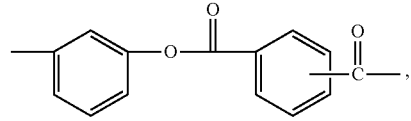

and optionally, 1 to 20 mol % resorcinol carbonate units of the formula

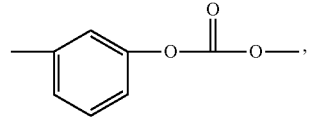

isophthalic acid-terephthalic acid-bisphenol-A ester units of the formula

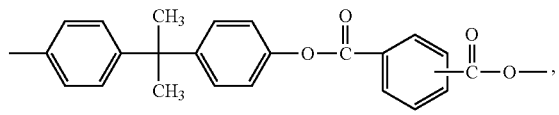

or a combination comprising at least one of the foregoing;

the second polymer comprises 1 to 20 mol % of bisphenol A carbonate units of the formula

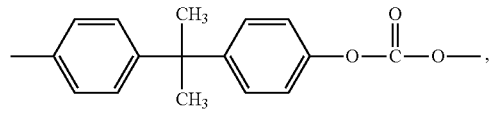

greater than 60 to 90 mol % of isophthalic acid-terephthalic acid-resorcinol units of the formula

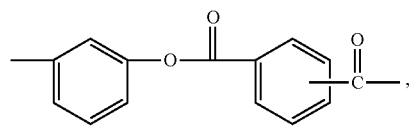

and siloxane units in an amount effective to provide 0.1 to 10 wt. % of siloxane units, based on the weight of the second polymer, wherein the siloxane units are of the formula

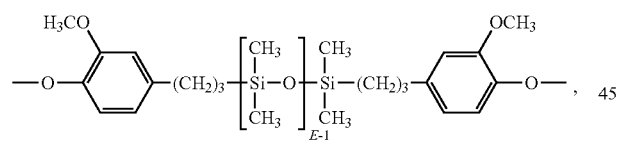

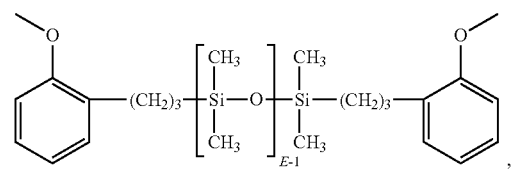

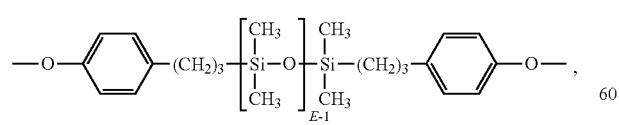

or a combination comprising at least one of the foregoing, wherein E has an average value of 2 to 90;

wherein the aromatic organophosphorus compound is of the formula

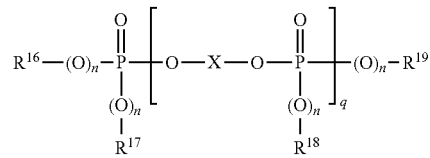

wherein each of $R^{16}$, $R^{17}$, $R^{18}$ and $R^{19}$ is phenyl, and

X is of the formula

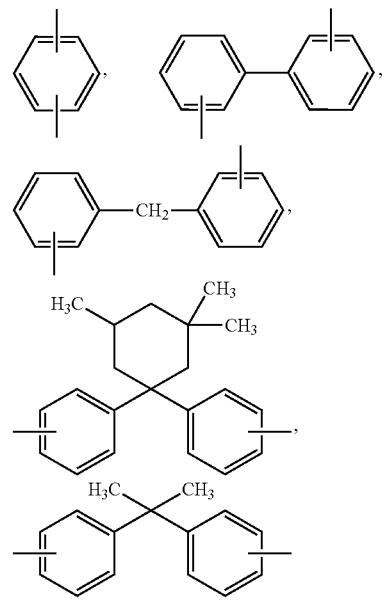

each n is 1, and q is from 1 to 5;

wherein a molded or formed sample of the thermoplastic polymer composition has a transmission of 70% to 87% or a haze of 2% to 10%, each measured according to ASTM D1003 using the color space CIE1931 (Illuminant C and a 2° observer) at a thickness of 3 mm, an OSU integrated 2 minute heat release test value of less than 65 kW-min/m² and a peak heat release rate of less than 65 kW/m², each measured using the method of FAR F25.4, in accordance with FAR 25.853 (d) at a thickness of 1.5 mm or 3 mm, an E662 smoke test DsMax value of less than 200 when measured at a thickness of 1.5 mm or 3 mm, a flame time of less than 15 seconds, a burn length of less than 6 inches, and a drip extinguishing time of less than 5 seconds, each measured using the method of FAR F25.5, in accordance with FAR 25.853(a) at a thickness of 1.5 mm or 3 mm, an energy in multiaxial impact of 100 J or more and a ductility in multiaxial impact of 100%, measured at +23° C. at an impact speed of 4.4 m/second in accordance with ISO 6603 on 3.2 mm thick discs, and optionally, a melt volume flow rate of greater than 5 cc/10 min measured at 300° C. under 1.2 kg force according to ISO 1133.

30. An aircraft component wherein the component is a window, window dust cover, partition, light cover, electronics screen, display cover, or plastic mirror, and wherein the aircraft component is molded or formed from a thermoplastic polymer composition comprising, based on the total weight of the composition, 2.5 to 10 wt. % of an organophosphorus compound;
90 to 97.5 wt. % of a first polymer, or a second polymer, or a combination comprising at least one of the foregoing polymers; and
optionally, up to 5 wt. % of an additive composition comprising an additive selected from a processing aid, a heat stabilizer, an ultra violet light absorber, a colorant, or a combination comprising at least one of the foregoing;

wherein
the first polymer comprises:
2 to 20 mol % of bisphenol-A carbonate units of the formula

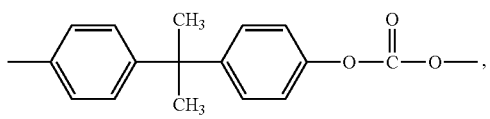

greater than 60 to 98 mol % of isophthalic acid-terephthalic acid-resorcinol ester units of the formula

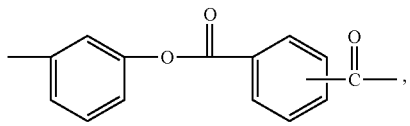

and
optionally, 1 to 20 mol % resorcinol carbonate units of the formula

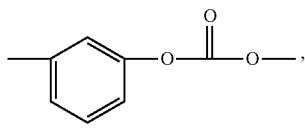

isophthalic acid-terephthalic acid-bisphenol-A ester units of the formula

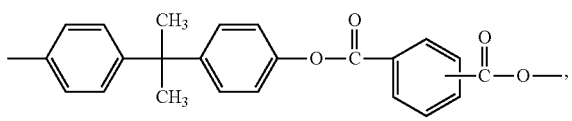

or a combination comprising at least one of the foregoing;
the second polymer comprises
1 to 20 mol % of bisphenol A carbonate units of the formula

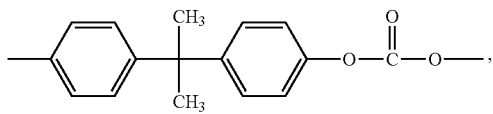

greater than 60 to 90 mol % of isophthalic acid-terephthalic acid-resorcinol units of the formula

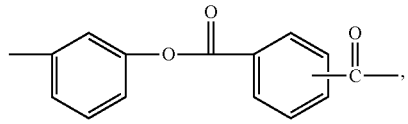

and
siloxane units in an amount effective to provide 0.1 to 10 wt. % of siloxane units, based on the weight of the second polymer,
wherein the siloxane units are of the formula

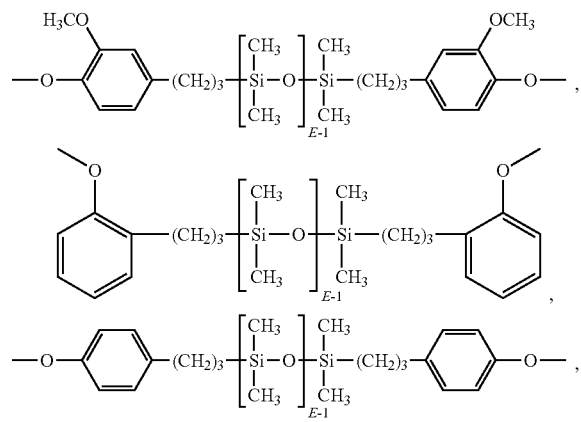

or a combination comprising at least one of the foregoing, wherein E has an average value of 2 to 90;
wherein the aromatic organophosphorus compound is of the formula

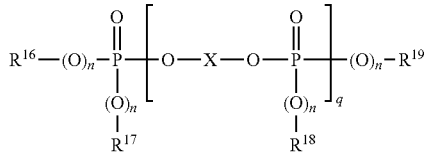

wherein
each of $R^{16}$, $R^{17}$, $R^{18}$ and $R^{19}$ is phenyl, and
X is of the formula

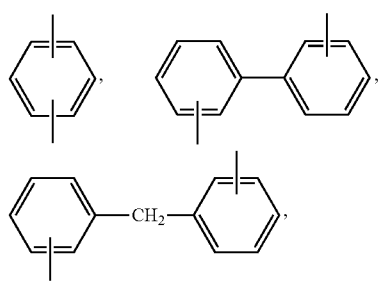

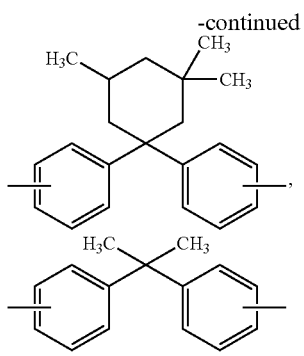
, or

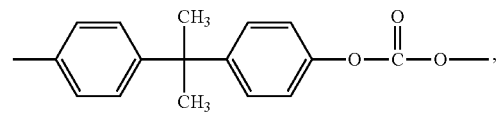

each n is 1, and q is from 1 to 5 wherein a molded or formed sample of the thermoplastic polymer composition has a transmission of 85% or more or a haze of 3% or less, each measured according to ASTM D1003 using the color space CIE1931 (Illuminant C and a 2° observer) at a thickness of 3 mm, an OSU integrated 2 minute heat release test value of less than 65 kW-min/m$^2$ and a peak heat release rate of less than 65 kW/m$^2$, each measured using the method of FAR F25.4, in accordance with FAR 25.853 (d) at a thickness of 1.5 or 3 mm, an E662 smoke test DsMax value of less than 200 when measured at a thickness of 1.5 mm or 3 mm, a flame time of less than 15 seconds, a burn length of less than 6 inches, and a drip extinguishing time of less than 5 seconds, each measured using the method of FAR F25.5, in accordance with FAR 25.853(a) at a thickness of 1.5 mm or 3 mm, an energy in multiaxial impact of 100 J or more and a ductility in multiaxial impact of 100%, measured at +23° C. at an impact speed of 4.4 m/second in accordance with ISO 6603 on 3.2 mm thick discs, and optionally, a melt volume flow rate of greater than 5 cc/10 min measured at 300° C. under 1.2 kg force according to ISO 1133.

31. An aircraft component wherein the component is an access door panel, an access door panel call button, a seat component, a stow bin component, a magazine rack, a component of a stow bin, a magazine rack, a seat component, a trolly cart, a component of a trolley cart, a light bezel, a door pull, a door handle, an arm rest or a foot rest, and wherein the aircraft component is molded or formed from a thermoplastic polymer composition comprising, based on the total weight of the composition, 2.5 to 10 wt. % of an organophosphorus compound; and 90 to 97.5 wt. % of a first polymer, or a second polymer; and optionally, up to 5 wt. % of an additive composition comprising an additive selected from a processing aid, a heat stabilizer, an ultra violet light absorber, a colorant, or a combination comprising at least one of the foregoing;

wherein the first polymer comprises:

2 to 20 mol % of bisphenol-A carbonate units of the formula

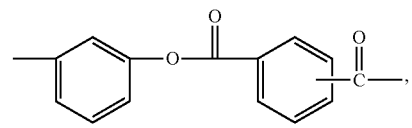

greater than 60 to 98 mol % of isophthalic acid-terephthalic acid-resorcinol ester units of the formula

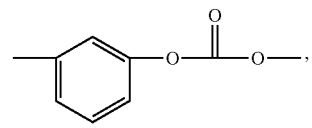

and optionally, 1 to 20 mol % resorcinol carbonate units of the formula

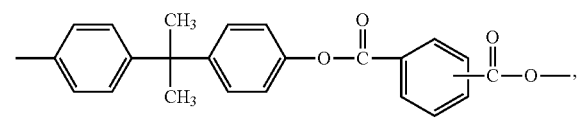

isophthalic acid-terephthalic acid-bisphenol-A ester units of the formula

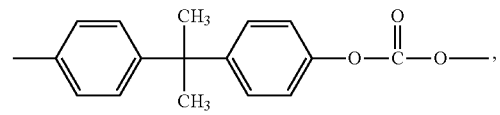

or a combination comprising at least one of the foregoing;

the second polymer comprises 1 to 20 mol % of bisphenol A carbonate units of the formula

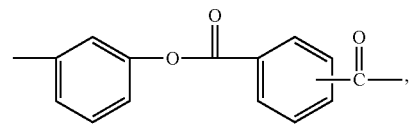

greater than 60 to 90 mol % of isophthalic acid-terephthalic acid-resorcinol units of the formula and siloxane units in an amount effective to provide 0.1 to 10 wt. % of siloxane units, based on the weight of the second polymer, wherein the siloxane units are of the formula

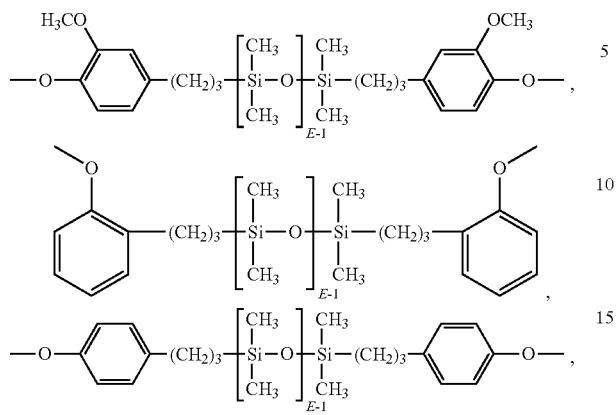

or a combination comprising at least one of the foregoing, wherein E has an average value of 2 to 90;
wherein the aromatic organophosphorus compound is of the formula

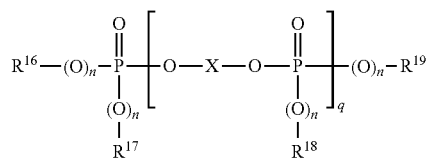

wherein
each of $R^{16}$, $R^{17}$, $R^{18}$ and $R^{19}$ is phenyl, and X is of the formula

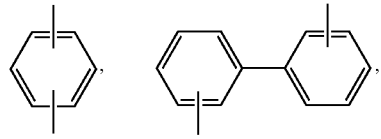

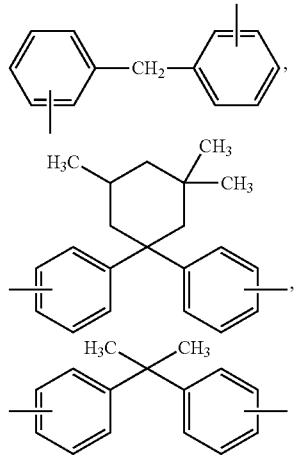

each n is 1, and
q is from 1 to 5; and
wherein a molded or formed sample of the thermoplastic polymer composition has
an OSU integrated 2 minute heat release test value of less than 65 kW-min/m² and a peak heat release rate of less than 65 kW/m², each measured using the method of FAR F25.4, in accordance with FAR 25.853 (d) at a thickness of 1.5 mm or 3 mm,
an E662 smoke test DsMax value of less than 200 when measured at a thickness of 1.5 mm or 3 mm,
a flame time of less than 15 seconds, a burn length of less than 6 inches, and a drip extinguishing time of less than 5 seconds, each measured using the method of FAR F25.5, in accordance with FAR 25.853(a) at a thickness of 1.5 mm or 3 mm,
an energy in multiaxial impact of 100 J or more and a ductility in multiaxial impact of 100%, measured at +23° C. at an impact speed of 4.4 m/second in accordance with ISO 6603 on 3.2 mm thick discs, and
optionally, a melt volume flow rate of greater than 5 cc/10 min measured at 300° C. under 1.2 kg force according to ISO 1133.

* * * * *